(12) United States Patent
Levy et al.

(10) Patent No.: US 11,651,411 B1
(45) Date of Patent: *May 16, 2023

(54) SYSTEMS, METHODS, AND DEVICES FOR DETERMINING AND DISPLAYING MARKET RELATIVE POSITION OF UNIQUE ITEMS

(71) Applicant: VAST.COM, INC., Austin, TX (US)

(72) Inventors: Joshua Howard Levy, Austin, TX (US); Thomas Wyatt Wilbur, Austin, TX (US); Lauri Moore, Austin, TX (US); Ron Maire Kurti, San Francisco, CA (US); Benjamin David Cohen, Austin, TX (US); Gary Joseph Marcotte, Oakland Park, FL (US)

(73) Assignee: Vast.com, Inc., Austin, TX (US)

(*) Notice: Subject to any disclaimer, the term of this patent is extended or adjusted under 35 U.S.C. 154(b) by 209 days.

This patent is subject to a terminal disclaimer.

(21) Appl. No.: 17/066,839

(22) Filed: Oct. 9, 2020

Related U.S. Application Data

(60) Division of application No. 16/134,421, filed on Sep. 18, 2018, now Pat. No. 10,839,442, which is a continuation of application No. 15/794,517, filed on Oct. 26, 2017, now Pat. No. 10,109,001, which is a continuation of application No. 14/060,434, filed on Oct. 22, 2013, now Pat. No. 9,830,635.

(60) Provisional application No. 61/779,033, filed on Mar. 13, 2013.

(51) Int. Cl.
*G06Q 30/00* (2012.01)
*G06Q 30/0601* (2023.01)

(52) U.S. Cl.
CPC ..... *G06Q 30/0629* (2013.01); *G06Q 30/0641* (2013.01)

(58) Field of Classification Search
CPC ............. G06Q 30/0629; G06Q 30/0641
USPC ................................. 705/26.1–27.2
See application file for complete search history.

(56) References Cited

U.S. PATENT DOCUMENTS

| | | |
|---|---|---|
| 5,459,656 A | 10/1995 | Fields |
| 5,687,322 A | 11/1997 | Deaton et al. |
| 6,026,388 A | 2/2000 | Liddy et al. |
| 6,029,195 A | 2/2000 | Herz |
| 6,266,649 B1 | 7/2001 | Linden |
| 6,430,539 B1 | 8/2002 | Lazarus et al. |
| 6,510,406 B1 | 1/2003 | Marchisio |
| 6,539,392 B1 | 3/2003 | Rebane |
| 6,611,726 B1 | 8/2003 | Crosswhite |
| 6,711,581 B2 | 3/2004 | Rebane |
| 6,751,600 B1 | 6/2004 | Wolin |

(Continued)

OTHER PUBLICATIONS

U.S. Appl. No. 13/938,045 including its prosecution history, the cited references, and the Office Actions therein, Not yet published, Franke et al.

(Continued)

*Primary Examiner* — Anand Loharikar
(74) *Attorney, Agent, or Firm* — Knobbe, Martens, Olson & Bear, LLP

(57) ABSTRACT

The disclosure herein provides systems, methods, and devices for determining and displaying market relative positions and/or attributes of unique items. A visualization system for generating electronic visualizations of market-relative attributes of unique items comprises an item selection receiver, a visualization compilation engine, and a rendering engine.

20 Claims, 17 Drawing Sheets

(56) References Cited

U.S. PATENT DOCUMENTS

| | | |
|---|---|---|
| 6,751,614 B1 | 6/2004 | Rao |
| 6,775,664 B2 | 8/2004 | Lang et al. |
| 6,873,983 B2 | 3/2005 | Ugai et al. |
| 6,886,005 B2 | 4/2005 | Davis |
| 7,013,005 B2 | 3/2006 | Yacoub et al. |
| 7,069,258 B1 | 6/2006 | Bothwell |
| 7,165,119 B2 | 1/2007 | Fish |
| 7,167,871 B2 | 1/2007 | Farahat et al. |
| 7,191,143 B2 | 3/2007 | Keli |
| 7,206,780 B2 | 4/2007 | Slackman |
| 7,225,107 B2 | 5/2007 | Buxton et al. |
| 7,243,102 B1 | 7/2007 | Naam et al. |
| 7,260,568 B2 | 8/2007 | Zhang et al. |
| 7,283,951 B2 | 10/2007 | Marchisio et al. |
| 7,293,017 B2 | 11/2007 | Hurst-Hiller et al. |
| 7,356,430 B2 | 4/2008 | Miguelanez et al. |
| 7,395,170 B2 | 7/2008 | Scott et al. |
| 7,398,201 B2 | 7/2008 | Marchisio et al. |
| 7,433,885 B2 | 10/2008 | Jones |
| 7,440,955 B2 | 10/2008 | Khandelwal et al. |
| 7,444,308 B2 | 10/2008 | Guyon et al. |
| 7,467,232 B2 | 12/2008 | Fish et al. |
| 7,509,321 B2 | 3/2009 | Wong et al. |
| 7,523,047 B1 | 4/2009 | Neal et al. |
| 7,542,947 B2 | 6/2009 | Guyon et al. |
| 7,565,362 B2 | 7/2009 | Brill et al. |
| 7,593,904 B1 | 9/2009 | Kirshenbaum et al. |
| 7,593,934 B2 | 9/2009 | Li et al. |
| 7,596,552 B2 | 9/2009 | Levy et al. |
| 7,603,348 B2 | 10/2009 | He et al. |
| 7,631,008 B2 | 12/2009 | Carson et al. |
| 7,636,715 B2 | 12/2009 | Kalleh |
| 7,647,314 B2 | 1/2010 | Sun et al. |
| 7,657,493 B2 | 2/2010 | Meijer et al. |
| 7,660,581 B2 | 2/2010 | Ramer et al. |
| 7,664,746 B2 | 2/2010 | Majumder |
| 7,672,865 B2 | 3/2010 | Kumar et al. |
| 7,680,835 B2 | 3/2010 | MacLaurin et al. |
| 7,685,197 B2 | 3/2010 | Fain et al. |
| 7,693,818 B2 | 4/2010 | Majumder |
| 7,693,901 B2 | 4/2010 | Ka et al. |
| 7,716,202 B2 | 5/2010 | Slackman |
| 7,716,217 B2 | 5/2010 | Marston et al. |
| 7,716,225 B1 | 5/2010 | Dean et al. |
| 7,716,226 B2 | 5/2010 | Barney |
| 7,725,307 B2 | 5/2010 | Bennett |
| 7,725,451 B2 | 5/2010 | Jing et al. |
| 7,739,408 B2 | 6/2010 | Fish et al. |
| 7,761,447 B2 | 7/2010 | Brill et al. |
| 7,788,252 B2 | 8/2010 | Delli Santi et al. |
| 7,801,358 B2 | 9/2010 | Furmaniak et al. |
| 7,801,843 B2 | 9/2010 | Kumar et al. |
| 7,802,197 B2 | 9/2010 | Lew et al. |
| 7,805,331 B2 | 9/2010 | Demir et al. |
| 7,805,385 B2 | 9/2010 | Steck et al. |
| 7,805,438 B2 | 9/2010 | Liu et al. |
| 7,809,740 B2 | 10/2010 | Chung et al. |
| 7,818,186 B2 | 10/2010 | Bonissone et al. |
| 7,827,060 B2 | 11/2010 | Wright et al. |
| 7,827,170 B1 | 11/2010 | Horling et al. |
| 7,831,463 B2 | 11/2010 | Nagar |
| 7,836,057 B1 | 11/2010 | Micaelian et al. |
| 7,849,030 B2 | 12/2010 | Ellingsworth |
| 7,860,871 B2 | 12/2010 | Ramer et al. |
| 7,865,187 B2 | 1/2011 | Ramer et al. |
| 7,865,418 B2 | 1/2011 | Uenohara et al. |
| 7,870,017 B2 | 1/2011 | Kamath |
| 7,895,193 B2 | 2/2011 | Cucerzan et al. |
| 7,899,455 B2 | 3/2011 | Ramer et al. |
| 7,899,707 B1 | 3/2011 | Mesaros |
| 7,904,448 B2 | 3/2011 | Chung et al. |
| 7,908,238 B1 | 3/2011 | Nolet et al. |
| 7,912,458 B2 | 3/2011 | Ramer et al. |
| 7,912,713 B2 | 3/2011 | Vair et al. |
| 7,921,068 B2 | 4/2011 | Guyon et al. |
| 7,921,069 B2 | 4/2011 | Canny et al. |
| 7,930,197 B2 | 4/2011 | Ozzie et al. |
| 7,933,388 B1 | 4/2011 | Vanier et al. |
| 7,937,345 B2 | 5/2011 | Schmidtler et al. |
| 7,941,329 B2 | 5/2011 | Kenedy et al. |
| 7,958,067 B2 | 6/2011 | Schmidtler et al. |
| 7,966,219 B1 | 6/2011 | Singh et al. |
| 7,987,261 B2 | 7/2011 | Gamble |
| 8,001,121 B2 | 8/2011 | Wang et al. |
| 8,005,643 B2 | 8/2011 | Tunkelang et al. |
| 8,005,684 B1 | 8/2011 | Cheng et al. |
| 8,005,774 B2 | 8/2011 | Chapelle |
| 8,005,826 B1 | 8/2011 | Sahami et al. |
| 8,015,065 B2 | 9/2011 | Davies |
| 8,024,327 B2 | 9/2011 | Tunkelang et al. |
| 8,024,349 B1 | 9/2011 | Shao et al. |
| 8,027,864 B2 | 9/2011 | Gilbert |
| 8,027,865 B2 | 9/2011 | Gilbert |
| 8,032,405 B2 | 10/2011 | Gilbert |
| 8,051,033 B2 | 11/2011 | Kenedy et al. |
| 8,051,073 B2 | 11/2011 | Tunkelang et al. |
| 8,065,184 B2 | 11/2011 | Wright et al. |
| 8,065,254 B1 | 11/2011 | Das et al. |
| 8,069,055 B2 | 11/2011 | Keen |
| 8,078,606 B2 | 12/2011 | Slackman |
| 8,095,523 B2 | 1/2012 | Brave et al. |
| 8,099,376 B2 | 1/2012 | Serrano-Morales et al. |
| 8,126,881 B1 | 2/2012 | Sethi et al. |
| 8,326,845 B2 | 12/2012 | Sethi et al. |
| 8,375,037 B2 | 2/2013 | Sethi et al. |
| 8,600,823 B1 | 12/2013 | Raines et al. |
| 8,620,717 B1 | 12/2013 | Micaelian et al. |
| 8,645,844 B1 | 2/2014 | Strobel et al. |
| 8,650,093 B2 | 2/2014 | Seergy et al. |
| 8,744,925 B2 | 6/2014 | Seergy et al. |
| 8,868,572 B2 | 10/2014 | Sethi et al. |
| 8,954,424 B2 | 2/2015 | Gupta et al. |
| 9,104,718 B1 | 8/2015 | Levy et al. |
| 9,123,075 B2 | 9/2015 | Seergy et al. |
| 9,141,984 B2 | 9/2015 | Seergy et al. |
| 9,147,216 B2 | 9/2015 | Seergy et al. |
| 9,324,104 B1 | 4/2016 | Levy et al. |
| 9,460,467 B2 | 10/2016 | Seergy et al. |
| 9,465,873 B2 | 10/2016 | Franke et al. |
| 9,626,704 B2 | 4/2017 | Seergy et al. |
| 9,665,897 B2 | 5/2017 | Seergy et al. |
| 9,690,857 B1 | 6/2017 | Franke et al. |
| 9,710,843 B2 | 7/2017 | Levy et al. |
| 9,799,000 B2 | 10/2017 | Sethi et al. |
| 9,830,635 B1 | 11/2017 | Levy et al. |
| 10,007,946 B1 | 6/2018 | Levy et al. |
| 10,109,001 B1 | 10/2018 | Levy et al. |
| 10,115,074 B1 | 10/2018 | Sethi et al. |
| 10,127,596 B1 | 11/2018 | Franke et al. |
| 10,140,655 B2 | 11/2018 | Seergy et al. |
| 10,157,231 B1 | 12/2018 | Franke et al. |
| 10,223,720 B2 | 3/2019 | Seergy et al. |
| 10,223,722 B2 | 3/2019 | Seergy et al. |
| 10,268,704 B1 | 4/2019 | Sanderson et al. |
| 10,572,555 B1 | 2/2020 | Franke et al. |
| 10,643,265 B2 | 5/2020 | Levy et al. |
| 10,796,362 B2 | 10/2020 | Seergy et al. |
| 10,942,976 B2 | 3/2021 | Franke et al. |
| 2002/0035520 A1 | 3/2002 | Weiss |
| 2002/0077931 A1 | 6/2002 | Henrion et al. |
| 2003/0004745 A1 | 1/2003 | Takakura |
| 2003/0014402 A1 | 1/2003 | Sealand et al. |
| 2003/0088457 A1 | 5/2003 | Keil et al. |
| 2003/0089218 A1 | 5/2003 | Gang et al. |
| 2003/0225644 A1 | 12/2003 | Casati et al. |
| 2003/0229552 A1 | 12/2003 | Lebaric et al. |
| 2005/0027670 A1 | 2/2005 | Petropoulos |
| 2005/0086070 A1 | 4/2005 | Engelman |
| 2005/0154717 A1 | 7/2005 | Watson et al. |
| 2006/0026081 A1 | 2/2006 | Keil et al. |
| 2006/0041465 A1 | 2/2006 | Woehler |
| 2006/0248035 A1 | 11/2006 | Gendler |
| 2007/0027741 A1 | 2/2007 | Gruhl et al. |
| 2007/0060114 A1 | 3/2007 | Ramer et al. |

(56) References Cited

U.S. PATENT DOCUMENTS

| | | |
|---|---|---|
| 2007/0060129 A1 | 3/2007 | Ramer et al. |
| 2007/0143184 A1 | 6/2007 | Szmanda |
| 2007/0156514 A1 | 7/2007 | Wright et al. |
| 2007/0156887 A1 | 7/2007 | Wright et al. |
| 2007/0239373 A1 | 10/2007 | Nasle |
| 2008/0065425 A1 | 3/2008 | Giuffre et al. |
| 2008/0162574 A1 | 7/2008 | Gilbert |
| 2008/0222010 A1 | 9/2008 | Hudak et al. |
| 2009/0006118 A1 | 1/2009 | Pollak |
| 2009/0112927 A1 | 4/2009 | Chitnis et al. |
| 2011/0055207 A1 | 3/2011 | Schorzman et al. |
| 2012/0005045 A1* | 1/2012 | Baker .................. G06F 16/335 715/848 |
| 2012/0047158 A1 | 2/2012 | Lee et al. |
| 2013/0030870 A1 | 1/2013 | Swinson et al. |
| 2013/0159057 A1 | 6/2013 | Hsiao |
| 2013/0179252 A1 | 7/2013 | Dong et al. |
| 2013/0246300 A1 | 9/2013 | Fischer |
| 2014/0032572 A1 | 1/2014 | Eustice et al. |
| 2014/0046804 A1 | 2/2014 | Nadjarian et al. |
| 2014/0100989 A1* | 4/2014 | Zhang ................ G06Q 30/0283 705/26.61 |
| 2014/0257934 A1 | 9/2014 | Chrzan et al. |
| 2014/0258042 A1 | 9/2014 | Butler et al. |
| 2014/0258044 A1 | 9/2014 | Chrzan et al. |
| 2014/0279195 A1 | 9/2014 | Kubicki et al. |
| 2015/0100420 A1 | 4/2015 | Van Horn et al. |
| 2015/0324737 A1 | 11/2015 | Chrzan et al. |
| 2015/0324879 A1 | 11/2015 | Lu et al. |
| 2017/0011444 A1 | 1/2017 | Greystoke et al. |
| 2018/0053250 A1 | 2/2018 | Fisher |
| 2019/0318401 A1 | 10/2019 | Schulz et al. |
| 2020/0293580 A1 | 9/2020 | Franke et al. |

OTHER PUBLICATIONS

U.S. Appl. No. 15/981,750 including its prosecution history, the cited references, and the Office Actiosn therein, Not yet published, Levy et al.

Persaud et al., "Innovative mobile marketing via smartphones: Are consumers ready?", Article in Marketing Intelligence & Planning, Jun. 2012.

* cited by examiner

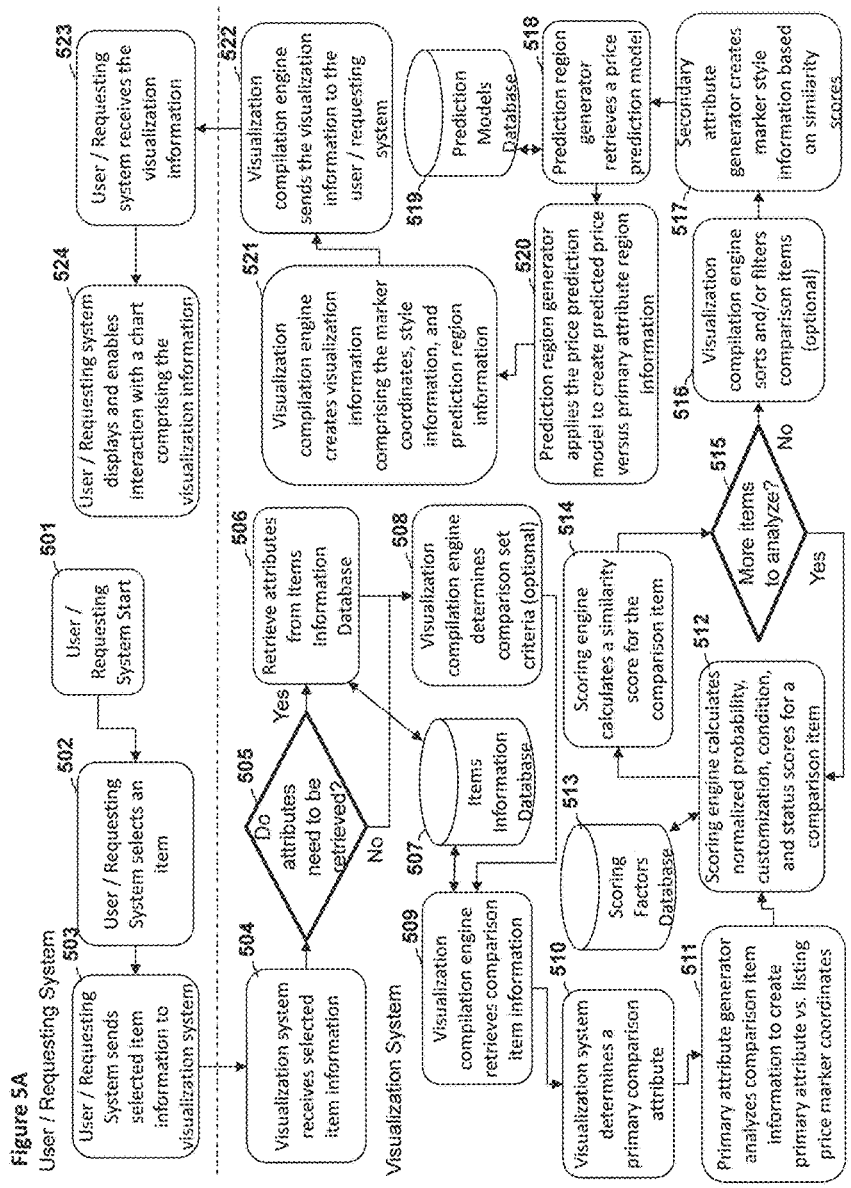

User / Requesting System

User / Requesting System

SYSTEMS, METHODS, AND DEVICES FOR DETERMINING AND DISPLAYING MARKET RELATIVE POSITION OF UNIQUE ITEMS

CROSS-REFERENCE TO RELATED APPLICATIONS

This application is a division of U.S. patent application Ser. No. 16/134,421, titled SYSTEMS, METHODS, AND DEVICES FOR DETERMINING AND DISPLAYING MARKET RELATIVE POSITION OF UNIQUE ITEMS, filed on Sep. 18, 2018, which is a continuation of U.S. patent application Ser. No. 15/794,517, titled SYSTEMS, METHODS, AND DEVICES FOR DETERMINING AND DISPLAYING MARKET RELATIVE POSITION OF UNIQUE ITEMS, filed on Oct. 26, 2017, which is a continuation of U.S. patent application Ser. No. 14/060,434, titled SYSTEMS, METHODS, AND DEVICES FOR DETERMINING AND DISPLAYING MARKET RELATIVE POSITION OF UNIQUE ITEMS, filed on Oct. 22, 2013, now U.S. Pat. No. 9,830,635, which claims the benefit of U.S. Provisional Application No. 61/779,033, titled SYSTEMS, METHODS, AND DEVICES FOR DETERMINING AND DISPLAYING MARKET RELATIVE POSITION OF UNIQUE ITEMS, filed on Mar. 13, 2013. This application is related to U.S. application Ser. No. 13/927,513, titled SYSTEMS, METHODS, AND DEVICES FOR MEASURING SIMILARITY OF AND GENERATING RECOMMENDATIONS FOR UNIQUE ITEMS, filed on Jun. 26, 2013, which claims the benefit of U.S. Provisional Application No. 61/774,325, titled SYSTEMS, METHODS, AND DEVICES FOR MEASURING SIMILARITY OF AND GENERATING RECOMMENDATIONS FOR UNIQUE ITEMS, filed on Mar. 7, 2013. This application is also related to U.S. application Ser. No. 13/924,375, titled SYSTEMS, METHODS, AND DEVICES FOR IDENTIFYING AND PRESENTING IDENTIFICATIONS OF SIGNIFICANT ATTRIBUTES OF UNIQUE ITEMS, filed on Jun. 21, 2013, which claims the benefit of U.S. Provisional Application No. 61/774,477, titled SYSTEMS, METHODS, AND DEVICES FOR IDENTIFYING SIGNIFICANT ATTRIBUTES OF UNIQUE ITEMS, filed on Mar. 7, 2013. Each of the foregoing applications is hereby incorporated by reference herein in its entirety.

BACKGROUND

Field

The disclosure relates generally to the field of unique items, and more specifically to systems, methods, and devices for determining and displaying market relative positions and/or attributes of unique items.

Description

When unique products or items, for example, used cars and existing homes, are considered for resale, buyers and sellers have an interest in understanding how one item compares to other items currently for sale or that have previously sold. However, considering the relatively large size of the markets for such items, it can be difficult to determine which alternative items to compare a selected item to, how to compare the items, and/or how to visualize a comparison of the items and their corresponding attributes. Accordingly, it can be advantageous to have systems, methods, and devices for determining what other items in a marketplace should be compared to a selected item, how to compare the items, and how the visualization should be rendered.

SUMMARY

The disclosure herein provides systems, methods, and devices for determining and displaying market relative positions and/or attributes of unique items, customizable items, and/or items having varying conditions, such as used vehicles, homes, commercial real estate, household goods, collectibles, automotive components, and the like.

In some embodiments, a computer-implemented method for generating electronic visualizations of market-relative attributes of unique items comprises receiving electronically, by a computer system, an indication of a selected item, the selected item being a unique item; accessing, by the computer system, an electronic database to determine a plurality of alternative unique items; generating, by the computer system, market-relative attribute information, the market-relative attribute information configured for processing by a user device and to cause the user device to display an electronic visualization of the market-relative attribute information, the electronic visualization comprising: a two-axis plot comprising a price axis showing a range of prices, a primary attribute axis showing a range of primary attribute values, and a plurality of markers, wherein each of the markers is positioned on the two-axis plot to show a listing price of one of the plurality of alternative unique items versus the primary attribute value of the alternative unique item; a predicted selling price region configured to show a range of predicted selling prices versus the range of primary attribute values shown by the primary attribute axis; wherein each of the plurality of markers is configured to show a relative similarity of the alternative unique item to the selected item; wherein markers associated with alternative unique items having a listing price within the range of predicted selling prices are positioned within the predicted selling price region; and transmitting, by the computer system, to the user device for processing, the market-relative attribute information; wherein the computer system comprises a computer processor and electronic memory.

In certain embodiments, a computer readable, non-transitory storage medium having a computer program stored thereon for causing a suitably programmed computer system to process by one or more processors computer-program code by performing a method for generating electronic visualizations of market-relative attributes of unique items when the computer program is executed on the suitably programmed computer system, the method comprises receiving electronically, by a computer system, an indication of a selected item, the selected item being a unique item; accessing, by the computer system, an electronic database to determine a plurality of alternative unique items; generating, by the computer system, market-relative attribute information, the market-relative attribute information configured for processing by a user device and to cause the user device to display an electronic visualization of the market-relative attribute information, the electronic visualization comprising: a two-axis plot comprising a price axis showing a range of prices, a primary attribute axis showing a range of primary attribute values, and a plurality of markers, wherein each of the markers is positioned on the two-axis plot to show a listing price of one of the plurality of alternative unique items versus the primary attribute value of the alternative unique item; a predicted selling price region configured to show a range of predicted selling prices versus the range of primary attribute values shown by the primary attribute axis; wherein each of the plurality of markers is configured to show a relative similarity of the alternative unique item to the selected item; wherein markers associated with alternative unique items having a listing price within the range of predicted selling prices are positioned within the predicted selling price region; and transmitting, by the computer system, to the user device for processing, the market-relative attribute information; wherein the computer system comprises a computer processor and electronic memory.

In some embodiments, a visualization system for generating electronic visualizations of market-relative attributes of unique items comprises: an item selection receiver configured to electronically receive selected item data, the selected item data being related to a plurality of attributes of a selected item; a visualization compilation engine configured to electronically communicate with an items information database to determine a plurality of alternative unique items; a rendering engine configured to electronically communicate with the visualization compilation engine to generate market-relative attribute information, the market-relative attribute information configured for processing by a user device and to cause the user device to display an electronic visualization of the market-relative attributes information, the electronic visualization comprising: a two-axis plot comprising a price axis showing a range of prices, a primary attribute axis showing a range of primary attribute values, and a plurality of markers, wherein each of the markers is positioned on the two-axis plot to show a listing price of one of the plurality of alternative unique items versus the primary attribute value of the alternative unique item; a predicted selling price region configured to show a range of predicted selling prices versus the range of primary attribute values shown by the primary attribute axis; wherein each of the plurality of markers is configured to show a relative similarity of the alternative unique item to the selected item; wherein markers associated with alternative unique items having a listing price within the range of predicted selling prices are positioned within the predicted selling price region; and one or more computers configured to operate the item selection receiver, visualization compilation engine, and rendering engine, wherein the one or more computers comprises a computer processor and an electronic storage medium.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present invention are described in detail below with reference to the drawings of various embodiments, which are intended to illustrate and not to limit the invention.

FIG. 5A depicts another embodiment of a process flow diagram illustrating an example of determining and displaying market relative attributes of unique items.

DETAILED DESCRIPTION OF THE EMBODIMENTS

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The disclosure herein provides systems, methods, and devices for generating electronic visualizations of market relative positions and/or attributes of unique items. In some embodiments, a visualization system is configured to determine what alternative items or products are most relevant with respect to a selected item and should be included in an electronic visualization that positions the selected unique item with respect to these alternative items. In some embodiments, the system is configured to show at least three different types of information using a single graph or chart.

Systems as described herein may be configured to compare a selected unique item, such as a used vehicle, existing home, and/or the like, to a comparison set of alternative unique items and to generate an electronic market position visualization illustrating, among other things, differences in attributes of the selected item and the comparison items. In some embodiments, the electronic market position visualization is configured to show at least three different types of information using a single graph. For example, the market position visualization 110 illustrated in FIG. 1B, as described in further detail below, illustrates at least three different types of information. The visualization 110 shows a first type of information by plotting, using markers 124 and 126, listing price versus mileage on a two axis plot. The visualization 110 further shows a second type of information, namely how similar comparison items are to the selected item, by modifying a color or shape of each marker 126. Thirdly, the visualization 110 shows a third type of information, namely whether each item has a listing price that is within a predicted range of selling prices based on the mileage of the car. In the visualization 110 illustrated in FIG. 1B, this predicted range is shown by the predicted price region 118 illustrated as a white band through the middle of the graph.

Figure 1A:
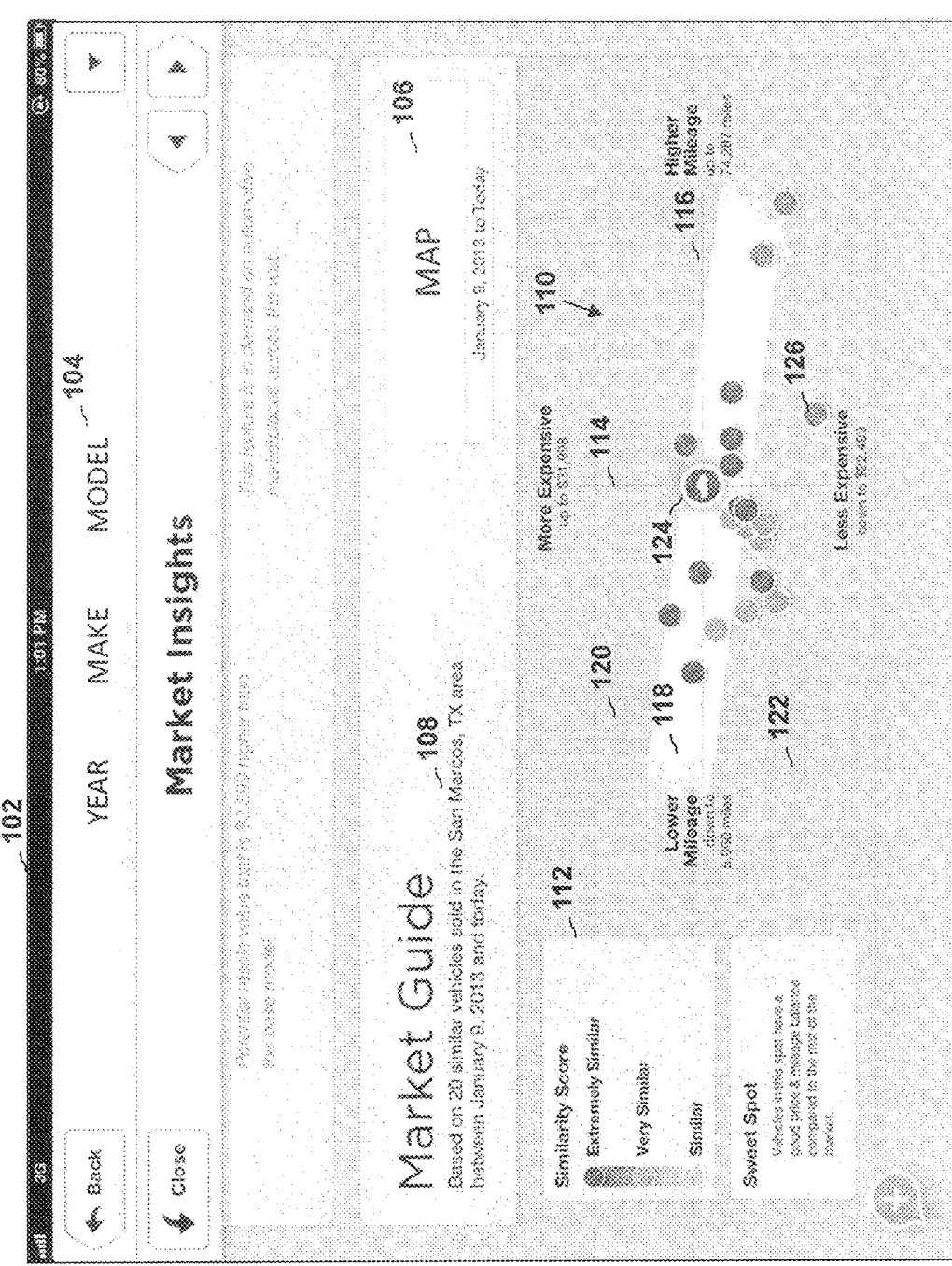
FIG. 1A is an embodiment of a schematic diagram illustrating a user access point system.
Figure 1B:
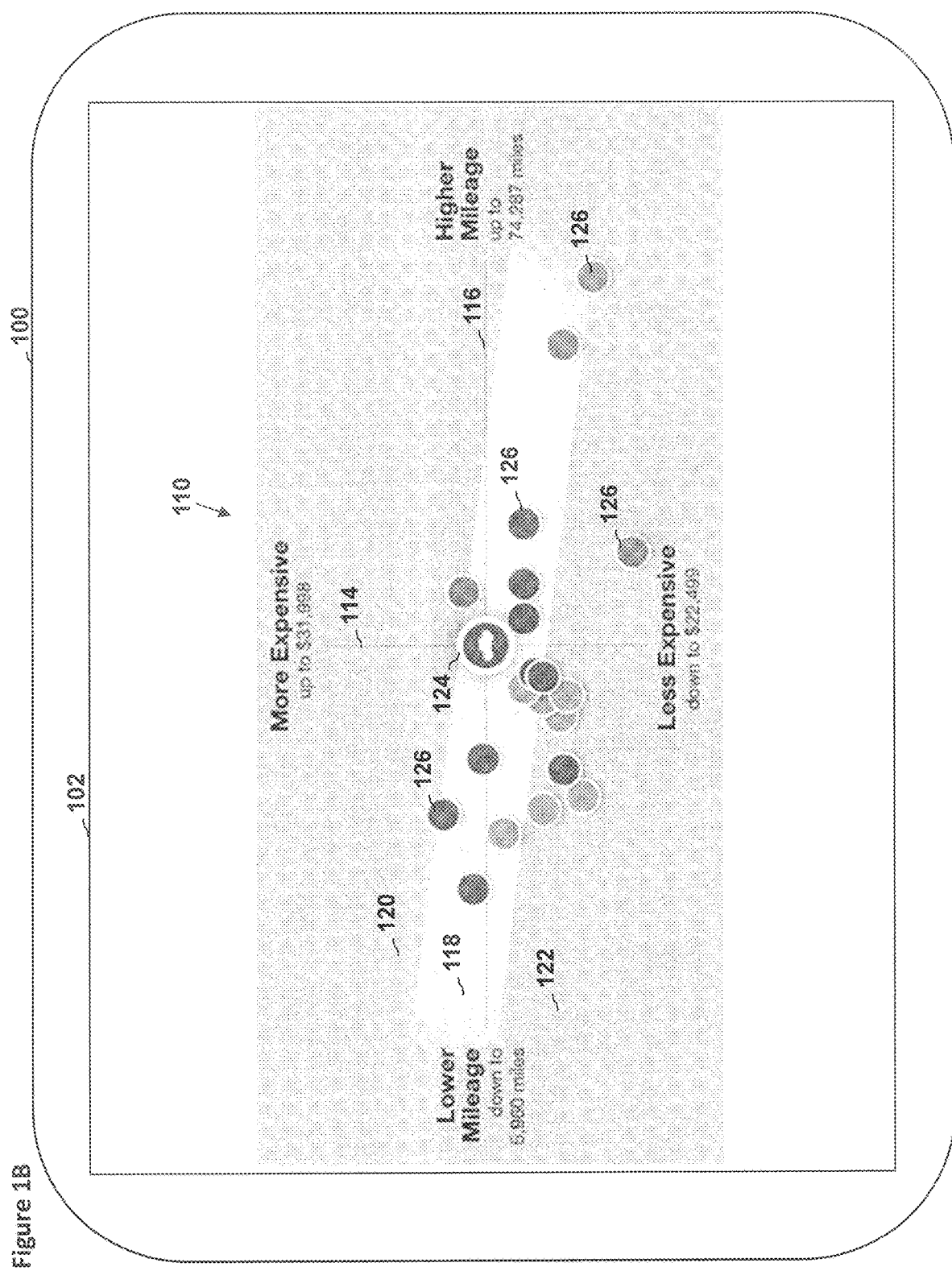
FIG. 1B is another embodiment of a schematic diagram illustrating the user access point system of FIG. 1A.

An electronic visualization as shown in FIG. 1B can be helpful to buyers and sellers dealing in markets of unique items. However, such a visualization comprising at least three different types of information can be difficult to create. For example, to enable a showing of the second type of information, such as similarity of each unique item to the selected unique item, a system may need to quantitatively calculate a measure of similarity between various unique items. Accordingly, systems, methods, and devices as described herein incorporate techniques of decomposing unique items into their relevant attributes and analyzing the items with respect to each other to determine a quantitative similarity score for each alternative or comparison item.

Further, the third type of information, such as a predicted selling price based on a primary attribute, can require a relatively complicated analysis of existing listings and/or prior sales to enable a correlation of the primary attribute to a predicted selling price. Accordingly, systems, methods, and devices described herein incorporate techniques of analyzing current items for sale, past sales, and/or user interactions with real-time electronic listing systems to develop models that enable the prediction of a selling price based on one or more attributes of an item. These features, in addition to various other features as described herein, enable a visualization system to produce an electronic visualization comprising a wealth of information, but that is easy and intuitive to interpret by a user of the visualization.

As can be seen in the example visualization 110 illustrated in FIG. 1B, a visualization comprising three or more types of information displayed simultaneously can be much more helpful than a traditional two axis plot in comparing unique items. For example, while the number of miles of a used vehicle may be an important attribute that plays a significant role in determining a selling price of that vehicle, various other attributes of used vehicles and other unique items may play a role in determining the items' desirability and/or selling price. For example, unique items, such as used vehicles, may have varying conditions, customizations, be located at various geographic regions, etc., which may all affect the market price of the item. Therefore, it can be advantageous to illustrate additional differences or similarities between a selected item and alternative items besides just a primary attribute (such as a number of miles). By illustrating a measure of similarity of each alternative item to the selected item, a viewer of the visualization 110 can more easily determine whether, for example, an alternative item having a listing price substantially higher or lower than the user would expect based on its mileage may have other differing attributes that may at least partially explain the price difference. In some embodiments, a system is configured to generate an electronic visualization that enables a user to, at a quick glance, determine three or more types of information about alternative or comparison unique items. These three types of information may comprise, among other options, a primary attribute value, a similarity score, and/or an indication of whether an item's price is within a predicted range.

When unique products or items are considered for resale, both buyers and sellers have an interest in understanding how an individual item is positioned relative to other alternative items for sale or recently sold in the same market. For example, if a buyer is in the market for a used vehicle, the buyer may be interested in knowing the prices other alternative vehicles in the same market have sold for in order to determine if the vehicle the user is interested in is priced appropriately. However, in comparing unique items, various attributes may play a role in determining the listing or selling price for each item. For example, with used vehicles, the number of miles on a vehicle may play a significant role in determining its selling price. However, various other attributes may also play a role in determining the vehicle's selling price. For example, whether a car has been in an accident before may affect the price. The color of a car, the condition of a car, any customizations, aftermarket equipment, etc., may all also affect a selling price. Therefore, there is an inherent difficulty in comparing one unique item to other unique items and in trying to determine and/or show an explanation for price variations between the items.

Two problems, among others, that the systems, methods, and devices disclosed herein address are 1) for a specific unique item, what alternative items should it be compared with, and 2) how can an electronic visualization show a representation of differences in a plurality of attributes without being overly complicated? Unique items, for example used cars or existing homes, can be described using various attributes or in multiple dimensions. For example, for cars, attributes such as price, mileage, make, model, features, condition, geographic location, and/or the like may be used to compare items and explain differences in pricing, etc. Unique items such as existing homes may have similar attributes, such as price, age, size or square footage, number of bedrooms, number of bathrooms, lot size, and/or the like. In some embodiments, systems, methods, and devices as described herein are configured to analyze these attributes to, among other things, narrow a comparison set to only the most relevant alternative items and to calculate a similarity between the alternative items and a selected item.

In some embodiments, the market relative position of a used car in the market as compared to alternative items is visualized using a two axis price/primary attribute graph.

The primary attribute may be, for example, mileage. The selected item and each alternative item are displayed as a point or a marker on this two dimensional graph. While such a two axis graph can be useful to enable observations of differences between the various items with respect to price and mileage, the distance between markers or points on such a graph is merely a measure of the difference in price and mileage. However, many other factors or attributes, such as condition, age, etc., can play a role in determining the price, and consequently can be obscured in a simple two axis price/mileage visualization. Accordingly, it can be advantageous to utilize an electronic visualization that shows an indication of these additional factors or attributes, in addition to the two axis display of a primary attribute versus another attribute, such as price.

One difficulty in generating an electronic visualization as described herein is determining an appropriate set of comparison or alternative unique items to display on the visualization. In some embodiments, a desirable comparison set is a set of products that are most similar to the target or selected item. However, determining the similarity of a set of comparison items to a target or selected item may involve gathering a large amount of information about alternative items for sale or recently sold in the market and analyzing those items and comparing their attributes to the selected item. In some embodiments, this requires a complete inventory of what is for sale and/or has recently sold in a market, and means for measuring a similarity between the selected item and the items in the comparison set. In some embodiments, a less than complete inventory can be used, as long as the inventory contains a sufficient number of items to create a usable comparison set. Systems, methods, and devices as further described below illustrate examples of calculating these similarity measurements as a part of a process for determining which alternative items to display on an electronic market position visualization.

In some embodiments, an electronic visualization or market position display is configured to display a two axis chart that incorporates the target or selected item and comparison items that are similar to the target item but newer/younger (and presumably higher priced), or older (and presumably lower priced) and to display a primary attribute of those items versus their listing price. The visualization system is additionally configured to incorporate a representation of similarity of the items and a representation of what it means to differ in some direction on the graph. For example, in addition to understanding that a relative difference of two positions on the graph represents an older or newer product, the system can also be configured to represent that a difference along another axis represents a difference in product features, for example, more features or less features. An example of this type of graph can be seen in FIG. 1C, as further described below.

In various embodiments, a visualization system can be configured to choose alternative or comparison items from different sources. For example, a system can be configured to choose a comparison set from a set of items that were previously sold in the same marketplace. In some embodiments, a system is configured to choose a comparison set from other active listings in the marketplace. In some embodiments, a system is configured to choose a comparison set from items that were previously sold and/or active listings in the same and/or one or more other marketplaces. In some embodiments, a marketplace can be defined in various ways. For example, a marketplace can be defined by item class, geography and time, and in various other ways, such as used vehicles sold in the state of Texas between Jan. 1, 2012 and Jan. 1, 2013.

Figure 6:
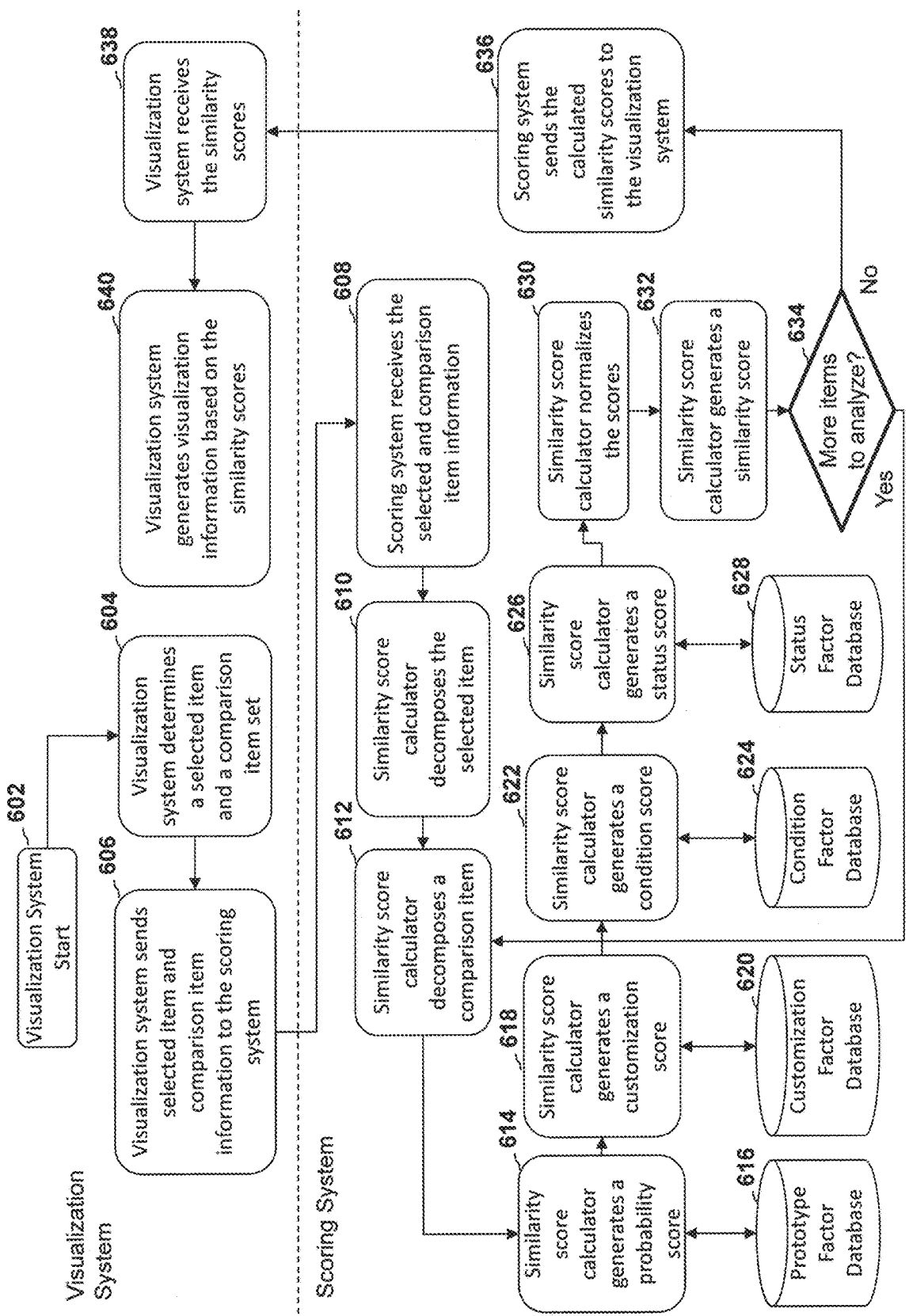
FIG. 6 depicts an embodiment of a process flow diagram illustrating an example of calculating similarity scores for use in comparing unique items.

In some embodiments, the systems, methods, and devices described herein utilize a measure of similarity between two items. The measure of similarity may, for example, be 0 or any positive number, with 0 indicating perfect similarity, and a larger number indicating an item that is less similar. In other embodiments, similarity can be indicated in other ways, such as a higher number indicating closer similarity. In one example, a system can be configured to decompose information describing unique items to determine the unique items' prototypes or classification (e.g., car year, make, and model), customizations (e.g., engine type, interior type, color, etc.), condition (e.g., number of miles, whether the title is clean, etc.), and/or statuses in the marketplace (e.g., listing price, geographic area, etc.). The system can be configured to take into account each of these factors by, for example, using a monotonic transformation of calculated dissimilarity penalties to generate a number indicating the amount of similarity between two items. An example similarity calculation process is illustrated in FIG. 6, as described in further detail below. Various other methods of calculating similarity scores and comparing the similarity of unique items can also be found in U.S. application Ser. No. 13/927,513, incorporated by reference herein, for example, the process flow illustrated in FIG. 9 of the '513 Application.

In some embodiments, a visualization system is configured to sort the marketplace inventory (historic and/or active inventory) by the similarity measure, and to optionally filter the inventory to produce a comparison set of only the most relevant items for display on an electronic market visualization. In some embodiments, a system is configured to enable selection of one or more attributes of an item for display on the electronic visualization as, for example, the primary attribute or attributes. In some embodiments, this primary attribute or attributes is selected by an administrator of the system. In other embodiments, a user of the system can select the one or more primary attributes from a larger set. For example, in the visualization illustrated in FIG. 1B, mileage is used as the display or primary attribute of the unique items in that visualization. Other attributes that may be selected as a primary attribute or display attribute may include, but are not limited to, age, price, number of previous owners, square footage, proximity to schools, etc.

In some embodiments, a visualization system is configured to use a predictive model to predict a price from one or more values of one or more attributes of an item. For example, referring to the visualization illustrated in FIG. 1B, this visualization system has predicted a selling price of the items based on their mileage attribute. The predicted selling price is shown as a diagonal white band across the graph, this white band being the predicted selling price region 118. If a marker for an item is illustrated within this predicted selling price region 118, that indicates the system has predicted that the item has a normal or predicted selling price within a certain range as based on the mileage attribute.

Figure 4A:
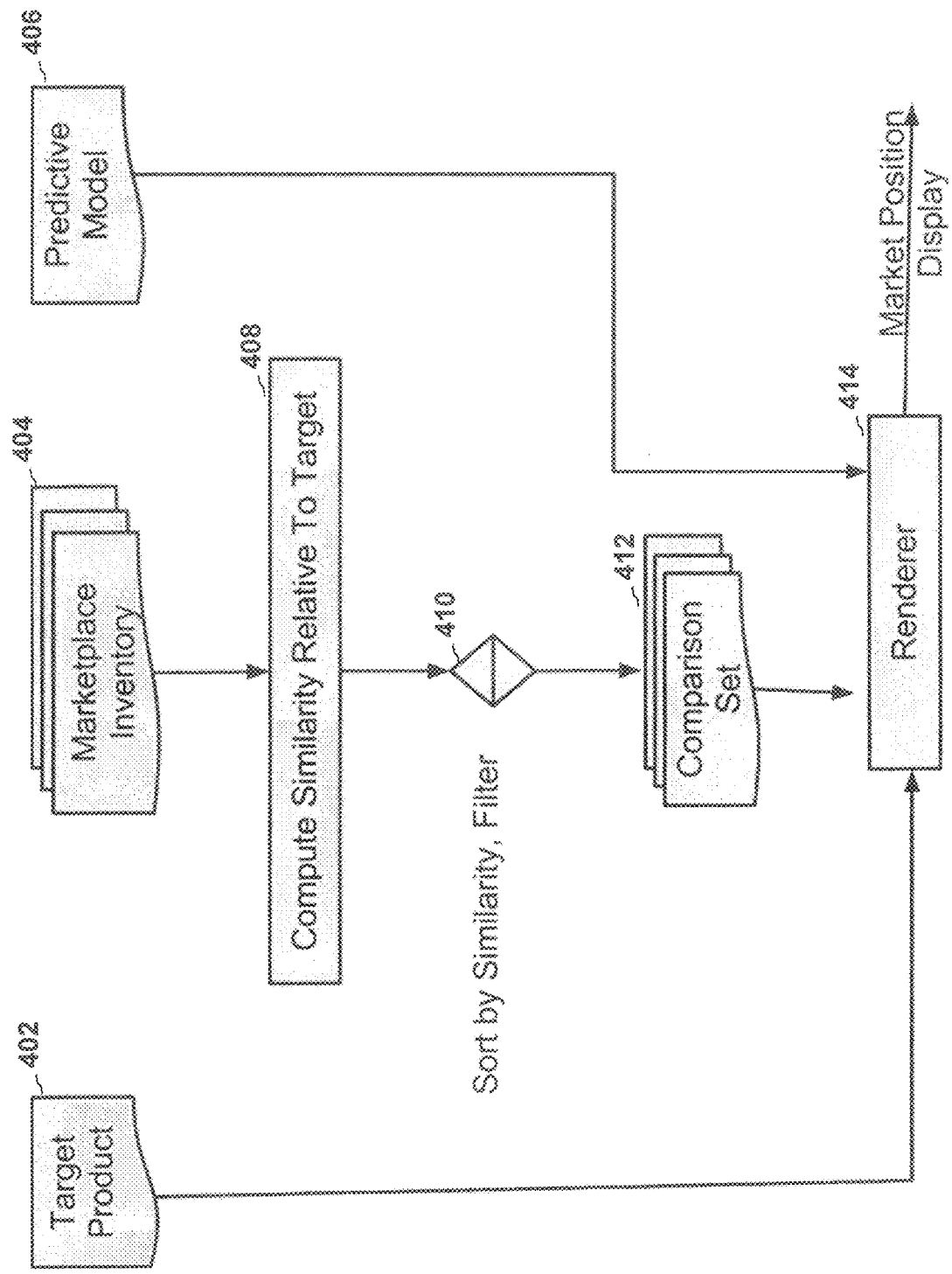
FIG. 4A depicts another embodiment of a process flow diagram illustrating an example of determining and displaying market relative attributes of unique items.
Figure 4B:
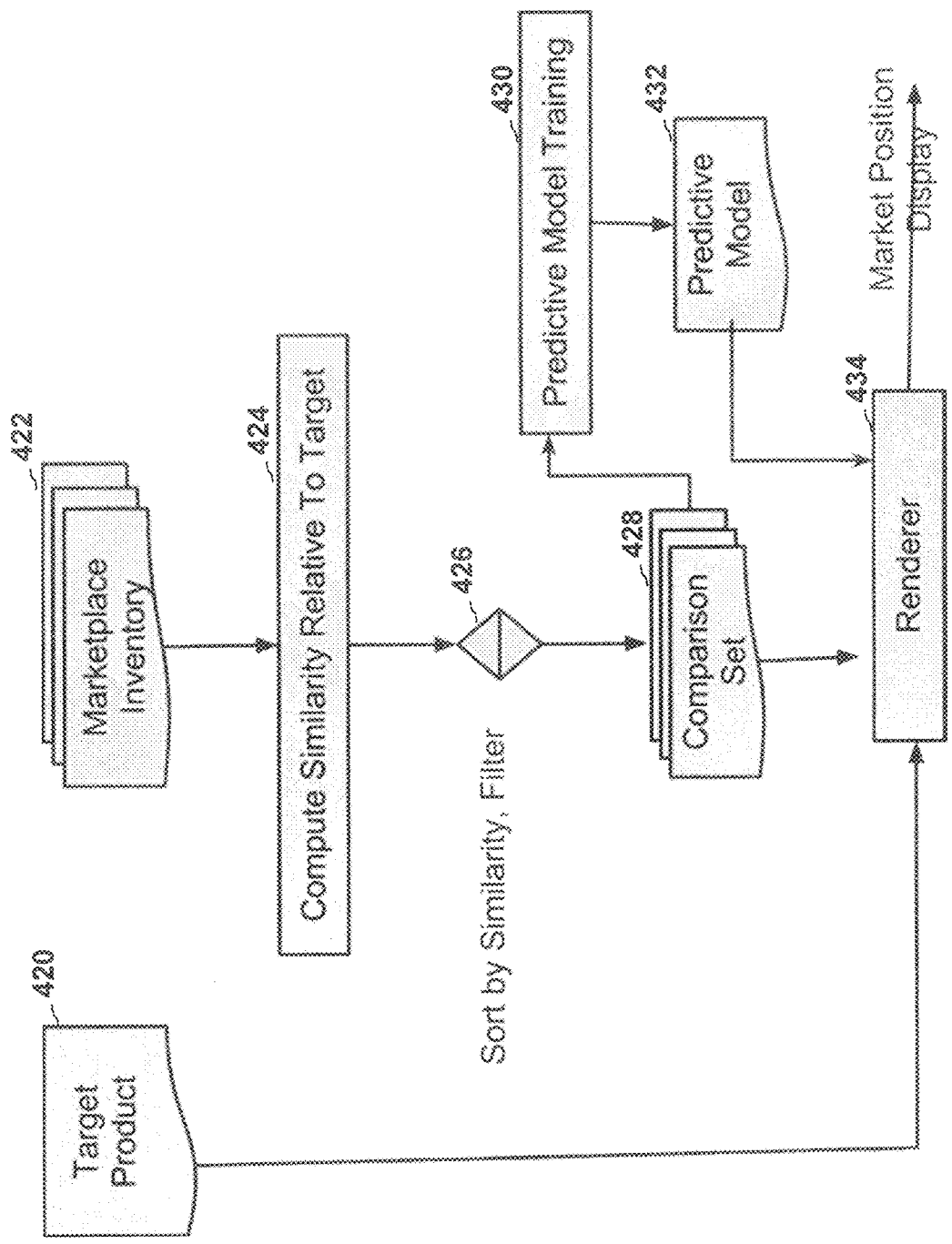
FIG. 4B depicts another embodiment of a process flow diagram illustrating an example of determining and displaying market relative attributes of unique items.
Figure 8:
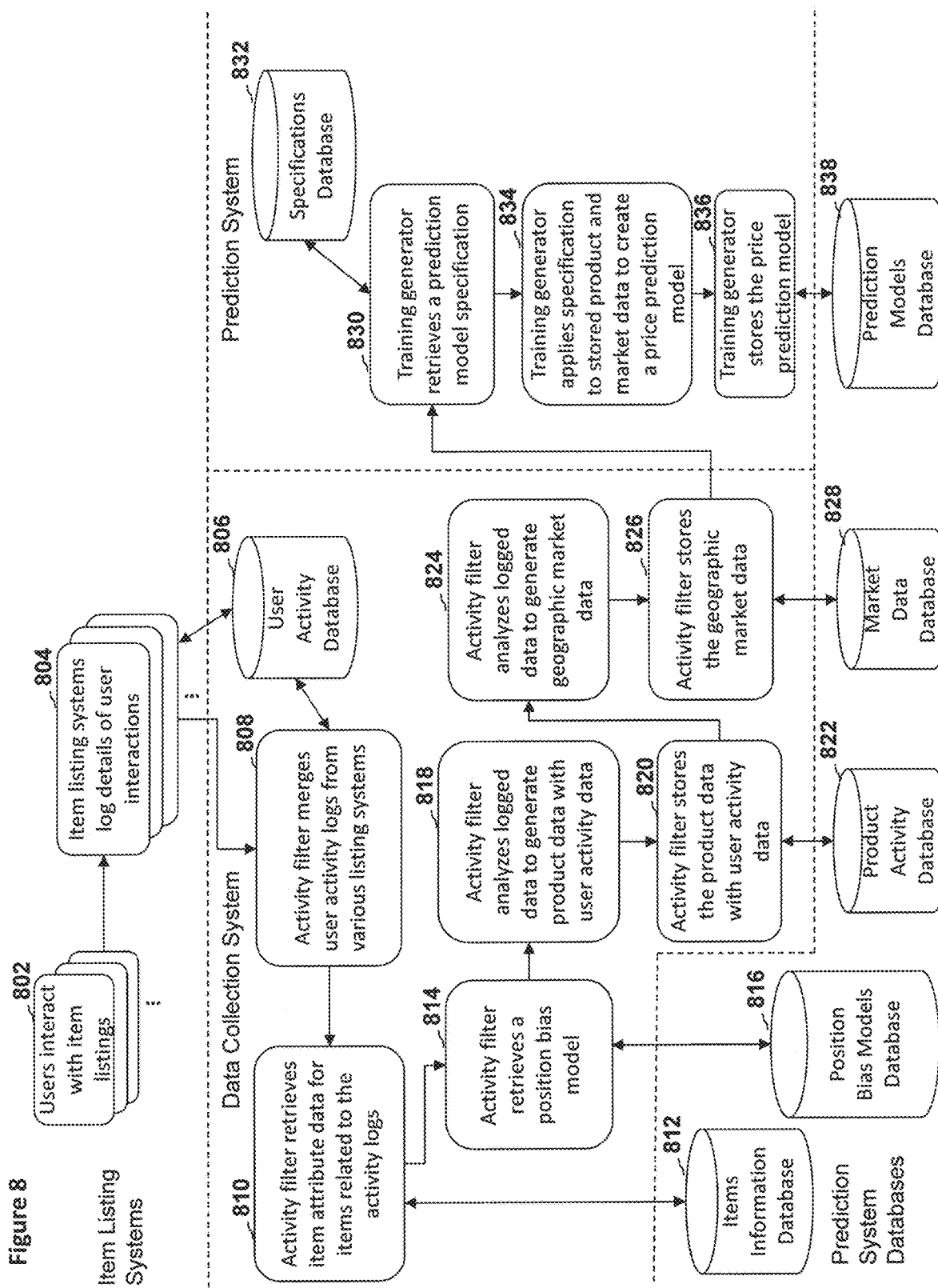
FIG. 8 depicts an embodiment of a process flow diagram illustrating an example of creating one or more prediction models.

In order to predict a selling price or other attribute based on one or more attributes of an item, in some embodiments, a visualization system utilizes a predictive model. In some embodiments, the predictive model is trained from the comparison set, as illustrated in FIG. 4B. In other embodiments, the predictive model is trained in a separate, for example, offline process, as illustrated in FIG. 4A. In some embodiments, the predictive model is a linear model offset to predict the price of the target product. Other types of predictive models may be used in other embodiments. In some embodiments, predictive models may be calculated as shown in FIG. 8, as further described below. In other embodiments, a predictive model may be calculated or trained using the concepts presented in U.S. application Ser. No. 13/924,375, incorporated by reference herein, for example, the process flow shown in FIG. 9 of the '375 Application.

Figure 1C:
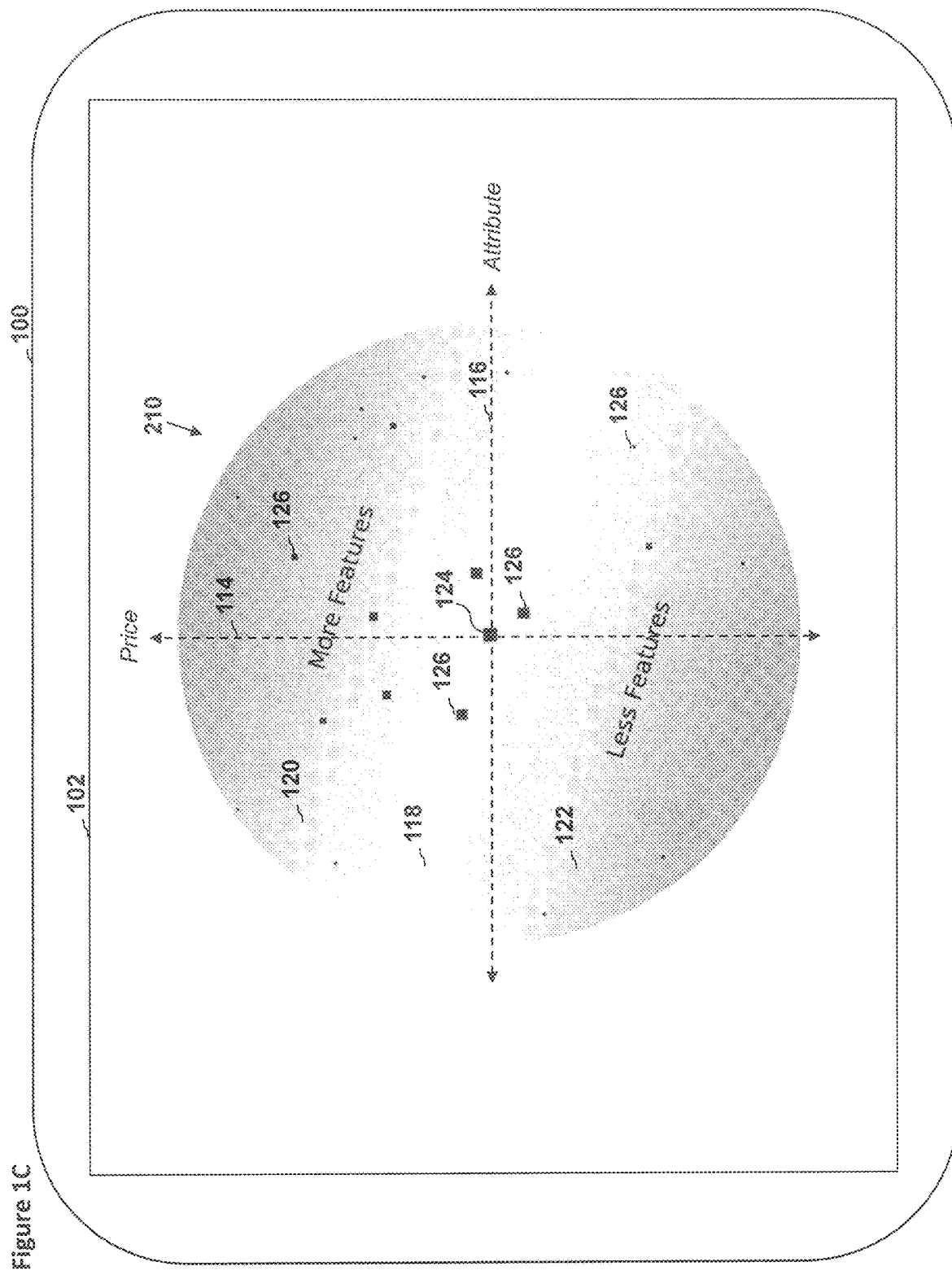
FIG. 1C is another embodiment of a schematic diagram illustrating the user access point system of FIG. 1A.

As described above, some embodiments comprise a market position display or an electronic visualization of a primary attribute versus a price. In some embodiments of this visualization, space is partitioned into three distinct regions: 1) a region where the difference between predicted price and the price of the target or selected item is explained by the change in the primary attribute; 2) a region where the price is significantly greater than the predicted price; and 3) a region where the price is significantly less than the predicted price. In some embodiments, the regions are labeled to indicate an explanation for the disagreement with the predicted price. In some embodiments, markers are added to the visualization to indicate, for example, price and attribute values for each alternative item (or for some alternative items) in the comparison set. A marker can, in some embodiments, be configured to offer a visual cue of the similarity between its items and the target or selected item or product. An example of such a visualization is shown in FIG. 1C. Region 1, indicated by the reference number 118, is white. Region 2 and Region 3, indicated by the reference numbers 120 and 122, respectively, are shown with a color gradient. The target or selected item is shown with a black square in the middle 124. The members of the comparison set are shown with squares of different colors and/or sizes 126, wherein the size and/or color of each square 126 represents the similarity between its product or item and the target product or item. In this embodiment, the largest marker 126 represents the most similar product in the comparison set to the target item.

In some embodiments, an electronic visualization of market relative attributes is static. In other embodiments, the visualization is dynamic, such as by allowing a user to explore the products in the comparison set and their differences from the target product. For example, a system may be configured to enable a user to click on or otherwise select a comparison item in a visualization as described herein and cause the system to display a popup or otherwise display information about that item. For example, a user may be able to click on an alternative used vehicle and see a popup dialogue with information describing that alternative item's condition, customization, market status, and/or the like.

In some embodiments, a visualization system operates in real time or substantially in real time to analyze selected items and alternative or comparison items, and to generate market position visualizations for displaying to users and/or to enable a user to interact with. In order to generate useful market position visualizations comprising a relatively useful number of alternative or comparison unique items, in some embodiments, a visualization system is required to consider or analyze 100's, 1,000's, 10,000s, or more alternative comparison items to generate a market position visualization as illustrated in FIG. 1A. In addition to the relatively large number of comparison items that may be analyzed, a relatively large number of variables and other factors must be calculated and stored, at least temporarily, in order to calculate similarities, predicted prices, and/or the like.

Accordingly, one or more computer systems comprising computer hardware are required to implement embodiments of visualization systems as disclosed herein. A human being would not be able to calculate similarity scores, prediction regions, and various other items that go into the creation of a market position visualization, because a human being would not be able to simultaneously keep track of all of the different alternative or comparison items, variables, factors, etc. that go into the creation of a market position visualization. Additionally, a user of a visualization system will likely expect a market position visualization to be displayed to the user within a relatively short amount of time after indicating a selected item. For example, in some embodiments, a user of a visualization system may expect a market position visualization to be displayed to that user in merely the amount of time it takes for an Internet webpage to load. In some embodiments, a market position visualization may need to be created and displayed in a matter of seconds, or even fractions of a second. Accordingly, one or more computer systems comprising computer hardware are required to operate embodiments of visualization systems described herein.

Market Position Visualizations

FIG. 1A is an embodiment of a schematic diagram illustrating a user access point system 100. The user access point system 100 comprises an electronic display 102. The electronic display 102 can be configured to electronically show, among other things, a market position visualization 110 as shown in the lower right portion of the electronic display 102. The user access point system 100 can comprise, for example, a tablet computer, a smartphone, a personal computer, or any other electronic device capable of generating an electronic visualization for viewing by a user. In some embodiments, the electronic display 102 comprises a touch screen or other means of input enabling a user to interact with the visualization.

The electronic display 102 in FIG. 1A illustrates item identifying information 104, a map 106, a heading 108, a market position visualization 110, and a legend 112. In this embodiment, the item identifying information 104 is intended to display, for example, a year, make, and model of a used vehicle that has been selected by a user. For example, this user access point system 100 may be being used by a user that is interested in comparing a selected used vehicle to other used vehicles on the market. The item identifying information 104 indicates the item that the user has selected. The map 106 can be configured to illustrate a map showing the location of the selected item. In some embodiments, the map 106 can additionally be configured to illustrate geographic positions of one or more of the comparison or alternative items displayed on the market position visualization 110.

The heading 108 can be configured to convey various information to a user. For example, in this embodiment, the heading 108 is indicating to the user the scope of information being displayed by the market position visualization 110. Here, the visualization 110 is based on 20 similar vehicles sold in the San Marcos, Tex. area between Jan. 9, 2013 and today.

The market position visualization 110 comprises a two axis plot having a y-axis 114 and an x-axis 116. The y-axis 114 in this embodiment is a price axis indicating a price of a used vehicle. The x-axis is a primary attribute axis indicating a mileage attribute of the various items on the visualization. The market position visualization 110 further comprises three regions based on a predicted selling price of the items. The visualization 110 comprises a predicted price region 118, a greater than predicted price region 120, and a less than predicted price region 122. In this embodiment, the three predicted regions are illustrated by a white band in the middle separating the two other regions. In various embodiments, the three regions may be illustrated in various ways, such as with a color gradient, shading, hatching, different colors in the different regions, lines indicating the boundaries of the regions, and/or various other methods of displaying different regions on a graph. Other embodiments may also comprise more or less than three regions.

The market position visualization 110 further comprises a selected item marker 124 and a plurality of comparison item markers 126. The selected item indicator or marker 124 is positioned at the center of this visualization. In other embodiments, the selected item indicator may not necessarily be positioned at the center or origin of the two axis graph. The markers 124 and 126 are positioned on the visualization 110 relative to the price axis 114 and the primary attribute axis 116 based on each item's price and primary attribute value, in this case mileage.

The comparison item markers 126 are shown with a shading indicative of how similar that marker's item is to the selected item. The legend 112 provides a guide to how similar each item is based on its shading. In this example, a darker shade indicates the item is more similar to the selected item, and a lighter shade indicates the item is less similar to the selected item. As shown by the legend 112, in this embodiment, the visualization 110 is only illustrating comparison items that are at least somewhat similar to the selected item. The legend 112 illustrates the lowest similarity as being called "similar." This may be advantageous, because a buyer or seller interested in a specific selected item may not be interested in items that are vastly different than that selected item. Therefore it may be advantageous to only illustrate selected items that are similar to the selected item above a certain threshold similarity level. In other embodiments, a visualization 110 may illustrate comparison or alternative items that are less similar than as is shown by this legend 112.

Although, in this embodiment, similarity is illustrated by darker or lighter shading of the various markers, similarity may in other embodiments be illustrated in various other ways. For example, markers may be different colors or different shades of different colors to indicate differences in similarity. In other embodiments, markers may be different shapes, different sizes, more or less opaque, and/or the like.

The legend 112 also indicates that a "sweet spot" is shown by a white band. This white band is illustrated by the predicted price region 118. As indicated by the legend 112, markers that are positioned in the sweet spot or predicted price region 118 likely have a good price and mileage balance compared to the rest of the market. However, mileage likely is not the only price driver attribute. Accordingly, it is advantageous to have a third type of information, namely similarity, displayed on the chart, because there may be certain reasons that an alternative item may fall outside of the predicted price region 118 but still be reasonably priced. For example, the alternative item marked as 126 in FIG. 1A is outside of the predicted price region 118, seemingly indicating this item does not have a good mileage and price balance, as compared to the rest of the market. However, that alternative item's marker is also a lighter shade than many of the markers in the sweet spot. Accordingly, it may be the case that this specific alternative item has one or more price driver attributes that are significantly different than the selected item's attributes and that would adequately explain the lower than predicted price. In some embodiments, the visualization 110 can be further configured to convey information about price driver attributes other than the primary attribute, such as by displaying a note next to the marker indicating that this item has a salvage title. This may, for example, help to explain why some items fall significantly outside of the predicted price region 118.

FIG. 1B is another embodiment of a schematic diagram illustrating the user access point system 100 of FIG. 1A. The embodiment illustrated in FIG. 1B is similar to the embodiment illustrated in FIG. 1A, except the market position visualization 110 has been enlarged. As described above, the market position visualization 110 is simultaneously illustrating three different types of information. The first type of information being illustrated is a primary attributed versus price value, as indicated by the X and Y coordinates of each marker 124 and 126 in the graph. The second type of information being displayed is whether each item falls within a predicted price region based on the primary attribute value. For example, if a marker is positioned in the predicted price region 118, the visualization system has determined that that item has a price within a predicted selling price range based on that item's mileage. The third type of information displayed by the market position visualization 110 is a similarity of each comparison item to the selected item. As described above, this similarity in this embodiment is illustrated by the shading of each marker 126.

In some embodiments, more than one attribute may be illustrated by the chart, either explicitly or implicitly. In this embodiment, one primary attribute, namely mileage, is explicitly displayed with respect to the price. However, various other attributes of each item that go into that item's price are illustrated, although not explicitly, by illustrating the similarity of that item to the selected item. For example, if the number of prior owners is an attribute that significantly affects price and/or desirability of a vehicle, an alternative item having a significantly different number of owners may be illustrated in a lighter shade indicating that item is significantly different than the selected item (and, accordingly, that this difference may at least partially explain any difference in price). In some embodiments, the similarity measurement is in a sense an aggregation of the differences of a plurality of attributes of the alternative items as compared to the selected item. While the primary attribute axis explicitly illustrates one attribute, the similarity score depiction illustrates an aggregation of differences in a plurality of additional attributes.

FIG. 1C is another embodiment of a schematic diagram illustrating the user access point system 100 of FIG. 1A. However, in this embodiment, the electronic display 102 is illustrating an alternate embodiment of a market position visualization 210. In this embodiment, the market position visualization 210 comprises a primary attribute axis 116, a price axis 114, a selected item indicator or marker 124, and a plurality of comparison or alternative item indicators or markers 126. This market position visualization is also divided into three regions 118, 120, and 122. In this embodiment, however, the three regions indicate or estimate a difference in a number of features rather than a predicted price. In this embodiment, items illustrated in the more features region 120 have more features than items in the less features region 122. The region 118 indicates items having identical or a similar number of features to the selected item 124. Although in this embodiment the three regions are shown by a color gradient, the regions may be illustrated in various other ways, as described above with respect to FIG. 1A.

Although various embodiments described herein utilize generally linear regions 118, 120, and 122, other embodiments may utilize regions having other shapes, such as curved, exponentially shaped, irregularly shaped, disjointed, etc., as determined by the underlying prediction model.

Visualization Systems

Figure 2A:
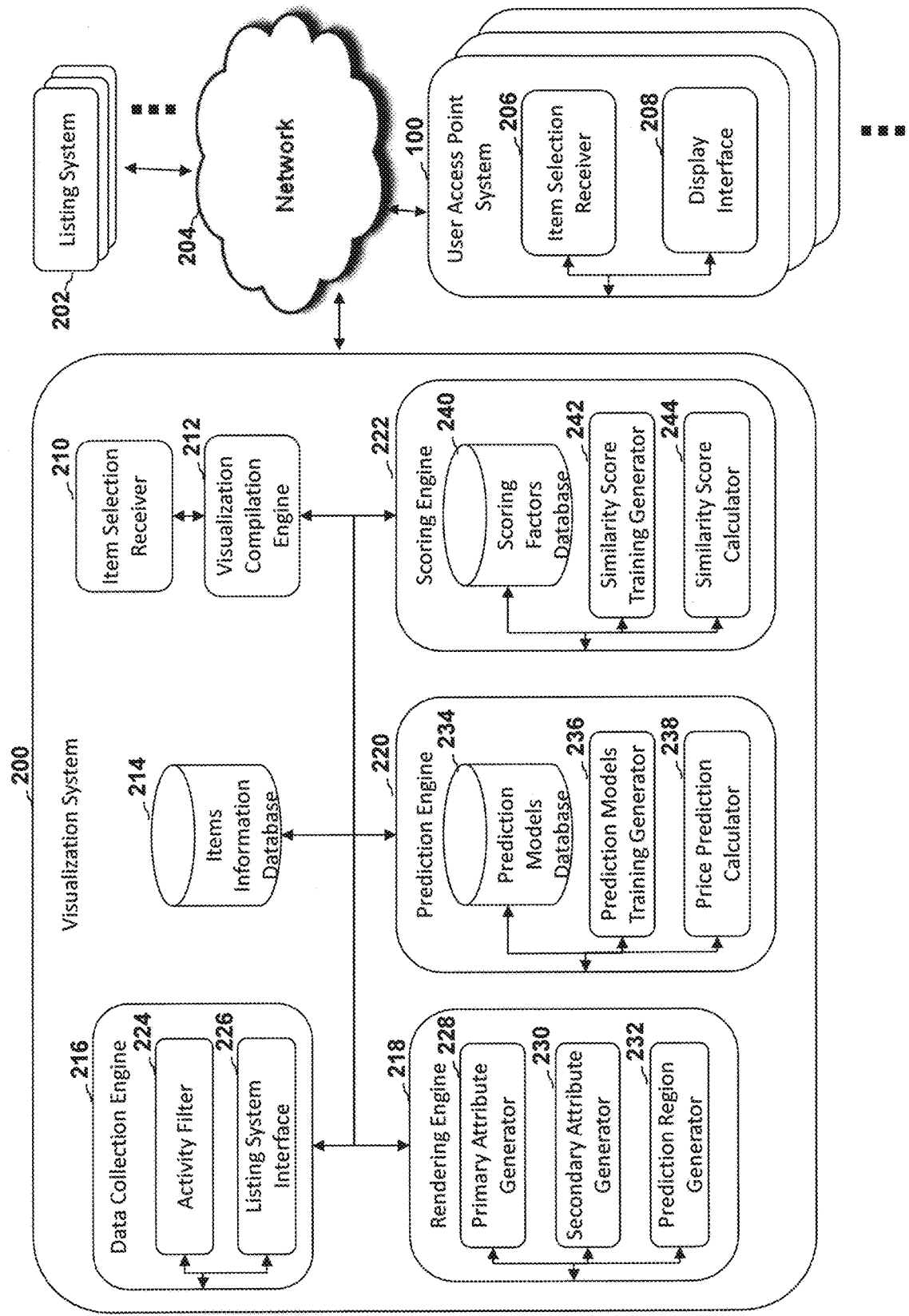
FIG. 2A is a block diagram depicting an embodiment of a visualization system in communication with one or more other systems.

FIG. 2A is a block diagram depicting an embodiment of a visualization system 200 in communication with one or more other systems. The visualization system 200 is configured to communicate through an electronic network 204 with one or more user access point systems 100 and one or more listing systems 202. The visualization system 200 can be configured to communicate with these other systems in order to generate market position visualizations for display to a user of a user access point system based on a selection of a selected item received from the user access point system. The visualization system 200 can comprise a computer server, a tablet computer, a personal computer, a smartphone, or any other computer system capable of performing the operations as described herein. Similarly, the user access point systems 100 and listing systems 202 can comprise various types of computer hardware systems configured to operate as described herein. In some embodiments, various modules, engines, generators, calculators, and other components of the visualization system 200 and other systems can be combined into different systems or separated out into more systems than are shown here, as long as they are able to perform the functions as described herein.

The electronic network 204 may comprise the internet, a local area network, a wide area network, a cell phone network, and/or any other type of electronic network capable of enabling electronic systems to communicate with each other.

The user access point systems 100 comprise an item selection receiver 206 and a display interface 208. The item selection receiver 206 can be configured to enable a user of the user access point system 100 to select a selected or target item. For example, the item selection receiver 206 may be configured to utilize the electronic display 102 illustrated in FIG. 1A to enable a user to search for, input information related to, or otherwise select a unique item that the user is interested in. For example, the item selection receiver 206 may be configured to enable a user to click on a used car listing. The display interface 208 can be configured to operate the electronic display 102 as illustrated in FIG. 1A. In some embodiments, as further described below, the user access point systems 100 can be configured to communicate through the network 204 with the visualization system 200 to communicate item selections to the visualization system 200 and to receive information describing a market position visualization for display by the display interface 208.

The listing systems 202 can be configured to list various unique items for sale to users of the systems. For example, the listing systems 202 can comprise internet websites offering used cars, existing homes, used goods, collectible items, and/or other unique items for sale. The listing systems 202 can be configured to enable users to interact with the systems to indicate preferences for items, purchase items, list items as sold, and/or to otherwise interact with the listings. The listing systems 202 can further be configured to log information related to the user interactions. The listing systems 202 can be configured to electronically communicate through the network 204 with the user access point systems 100 and/or the visualization system 200.

The visualization system 200 comprises an item selection receiver 210, a visualization compilation engine 212, an items information database 214, a data collection engine 216, a rendering engine 218, a prediction engine 220, and a scoring engine 222. The item selection receiver 210 can be configured to receive a selected item or information describing or related to a selected item from a user access point system 100 through the network 204. The visualization compilation engine 212 can be configured to then take that selected item information and compile a visualization based on various comparison items. The visualization compilation engine 212 can be configured to communicate with the rendering engine 218, prediction engine 220, and scoring engine 222 to create the market position visualization for sending back to the user access point system 100 for display to the user by the display interface 208.

The items information database 214 can be configured to store electronic information related to selected items and comparison items, such as an inventory of items currently listed for sale on the market, and/or items previously sold. In some embodiments, the items information database 214 comprises a complete inventory of items currently for sale on the market. In other embodiments, the items information database 214 is configured to store only a subset of items for sale on the market. The items information database 214 can be configured to electronically communicate with the various other components of the visualization system 200 to enable those components to carry out their intended functions.

The data collection engine 216 comprises an activity filter 224 and a listing system interface 226. The listing system interface 226 can be configured to electronically communicate with the plurality of listing systems 202 to gather information related to items listed for sale and user interactions with those items. The activity filter 224 can be configured to analyze the data gathered from the listing systems to, for example, determine the various attributes of the various items listed for sale, and to process logged user interactions with those items. The activity filter 224 can be configured to communicate with the items information database 214 to store and/or update information related to various items currently on the market and/or previously sold on the market.

The rendering engine 218 comprises a primary attribute generator 228, a secondary attribute generator 230, and a prediction region generator 232. The primary attribute generator 228 can be configured to generate the first type of information illustrated by a market position visualization, such as x-y coordinates for each marker. For example, the primary attribute generator 228 can be configured to determine, in the example shown in FIG. 1A, the number of miles and the listing price for the selected item and comparison items. The primary attribute generator 228 can then be configured to generate information comprising the coordinates that each marker should be shown at on the market position visualization 110.

The secondary attribute generator 230 can be configured to generate information related to the second type of information illustrated by a market position visualization, such as a similarity score indicator. For example, the secondary attribute generator 230 can be configured to generate the information for displaying the similarity of each alternative item as illustrated in FIG. 1A. The secondary attribute generator 230 may be configured to communicate with the scoring engine 222 to generate similarity scores for each alternative item and then to generate information to define how a marker for that item should be displayed to represent the similarity score.

The prediction region generator 232 can be configured to generate the third type of information displayed by a market position visualization, such as the prediction regions shown in FIG. 1A. For example, the prediction region generator 232 can be configured to communicate with the prediction engine 220 to generate the predicted selling price versus primary attribute data as illustrated by the predicted price region 118 illustrated in FIG. 1A. The prediction region generator 232 can be configured to generate data or information describing the predicted price region and any other regions to enable illustration of those regions by a market position visualization.

The prediction engine 220 comprises a prediction models database 234, a prediction models training generator 236, and a price prediction calculator 238. The prediction models database 234 can be configured to store prediction models for use by the price prediction calculator 238 in predicting, for example, a selling price based on a primary attribute of a unique item. This information can be used to, for example, generate a predicted selling price region as illustrated by the predicted price region 118 of FIG. 1A. The prediction models training generator 236 can be configured to analyze past sales and/or existing items on the market as gathered by the data collection engine 216 to create prediction models for storage in the prediction models database 234. The prediction model creation process is further described below with respect to FIG. 8.

Figure 7:
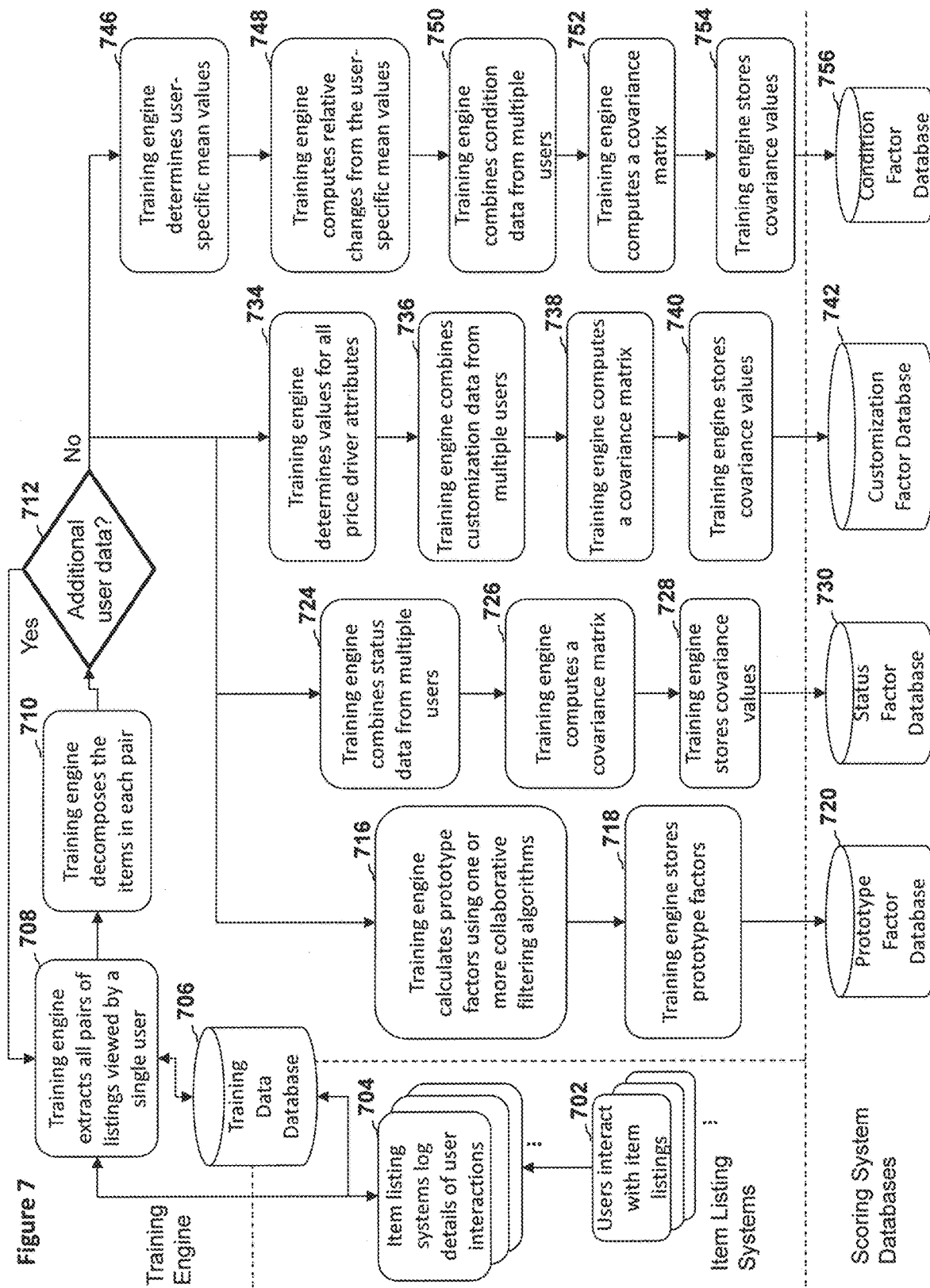
FIG. 7 depicts an embodiment of a process flow diagram illustrating an example of determining various factors for use in a similarity score calculation process.

The scoring engine 222 comprises a scoring factors database 240, a similarity score training generator 242, and a similarity score calculator 244. The scoring factors database 240 can be configured to store factors and other information to enable the similarity score calculator 244 to analyze the attributes of a selected item and comparison items to generate similarity scores for each of those comparison items. The similarity score training generator 242 can be configured to analyze information related to items currently on the market and/or previously sold on the market, along with logged user activity related to those items as gathered by the data collection engine 216, to create the scoring factors stored in the scoring factors database 240. The similarity score training generator process for creating the scoring factors is illustrated in FIG. 7 as further described below.

Figure 2B:
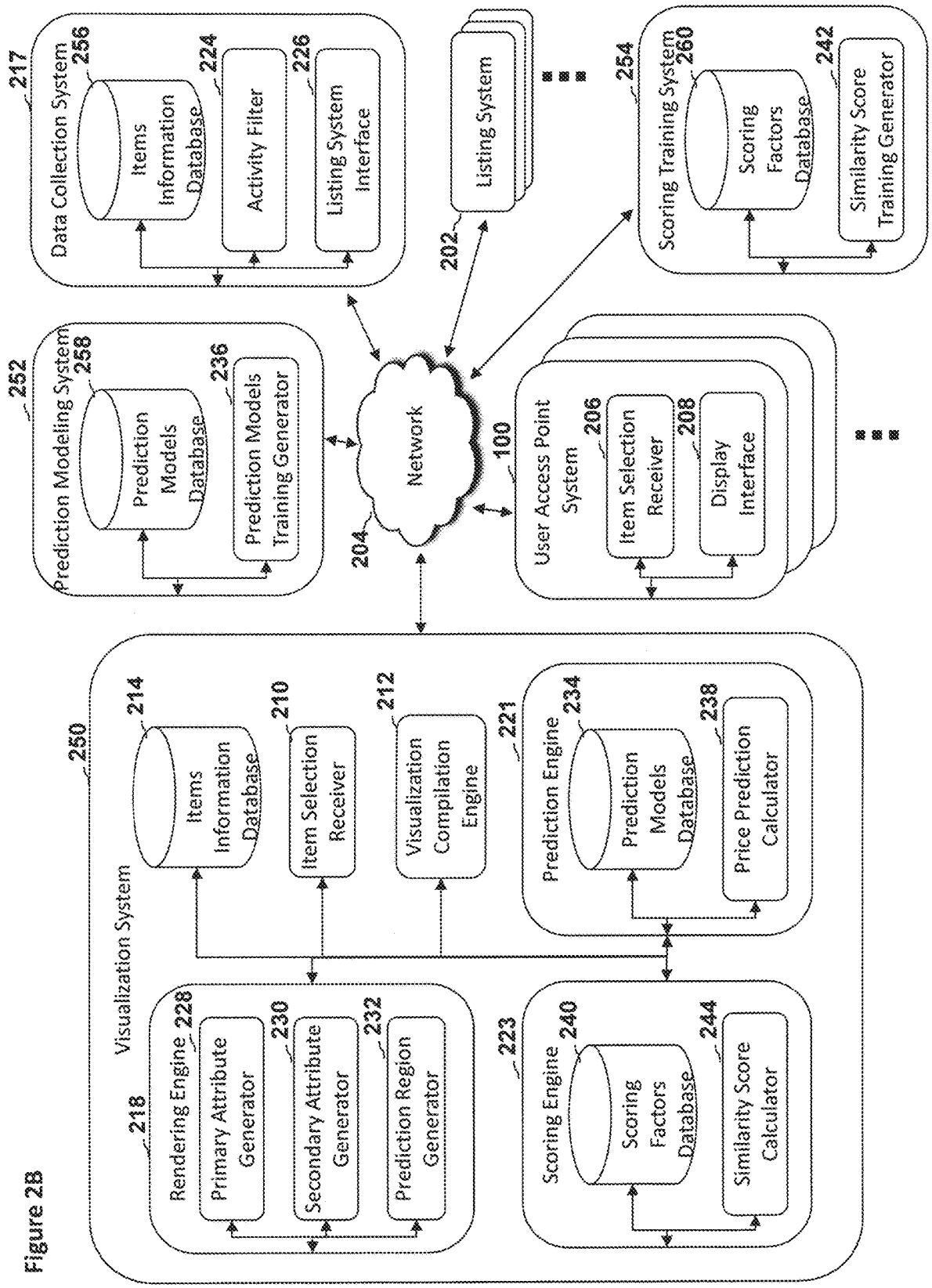
FIG. 2B is a block diagram depicting another embodiment of a visualization system in communication with one or more other systems.

FIG. 2B is a block diagram depicting another embodiment of a visualization system 250 in communication with one or more other systems. The visualization system 250 illustrated in FIG. 2B is similar to the visualization system 200 illustrated in FIG. 2A. However, the visualization system 250 is configured to rely on external systems to collect data related to items currently on the market or previously sold on the market and to create prediction models and scoring factors. The visualization system 250 is configured to communicate with a prediction modeling system 252, a data collection system 217, a plurality of listing systems 202, a scoring training system 254, and a plurality of user access point systems 100. The prediction modeling system 252 comprises a prediction models database 258 and a prediction models training generator 236. The prediction models training generator 236 can be configured to operate similarly to the prediction models training generator 236 illustrated in FIG. 2A. The prediction models training generator 236 can be configured to generate prediction models and to store the prediction models in the prediction models database 258. The visualization system 250 can be configured to communicate with the prediction modeling system 252 to acquire prediction models for storing in its prediction model database 234, for use in prediction calculations by the price prediction calculator 238.

The scoring training system 254 comprises a scoring factors database 260 and a similarity score training generator 242. The similarity score training generator 242 can be configured to generate similarity scoring factors as described in further detail below and to store these factors in the scoring factors database 260. The visualization system 250 can be configured to communicate with the scoring system 254 to acquire these scoring factors for storing in its scoring factors database 240 for generating similarity scores by the similarity score calculator 244.

The data collection system 217 comprises an items information database 256, an activity filter 224, and a listing system interface 226. The data collection system 217 can be configured to operate similarly to the data collection engine 216 illustrated in FIG. 2A, except the data collection system 217 can be configured to operate independently of the visualization system 250. The data collection system 217 can be configured to store collected information in its items information database 256. The data collection system 217 can be configured to communicate with the visualization system 250 to transfer its items information to the visualization system 250 for storage in its items information database 214.

In operation, to generate a market position visualization, the visualization compilation engine 212 can be configured to communicate with the prediction engine 221, the scoring engine 223, and the rendering engine 218 to generate the three types of information and to compile these into electronic data describing a market position visualization for sending to a user access point system 100 for display by the display interface 208.

Although various embodiments described herein are described with reference to three types of information being displayed by an electronic visualization, various embodiments may be configured to display a greater or fewer number of types of information and may be configured to display such information in various ways. For example, markers may show multiple types of information by having a shape that shows one type of information and a color that shows another type of information. Further, a chart may comprise more than two axes, such as by using a three-dimensional three axis chart. A chart may also utilize different coordinate systems, such as a cylindrical coordinate system, or even no coordinate system. For example, an electronic visualization may show its various types of information merely by positioning markers a certain distance away from the selected item's marker, by changing shapes, colors, etc. of the markers and/or by showing one or more regions, such as the predicted price regions described above or any other type of region.

Figure 2C:
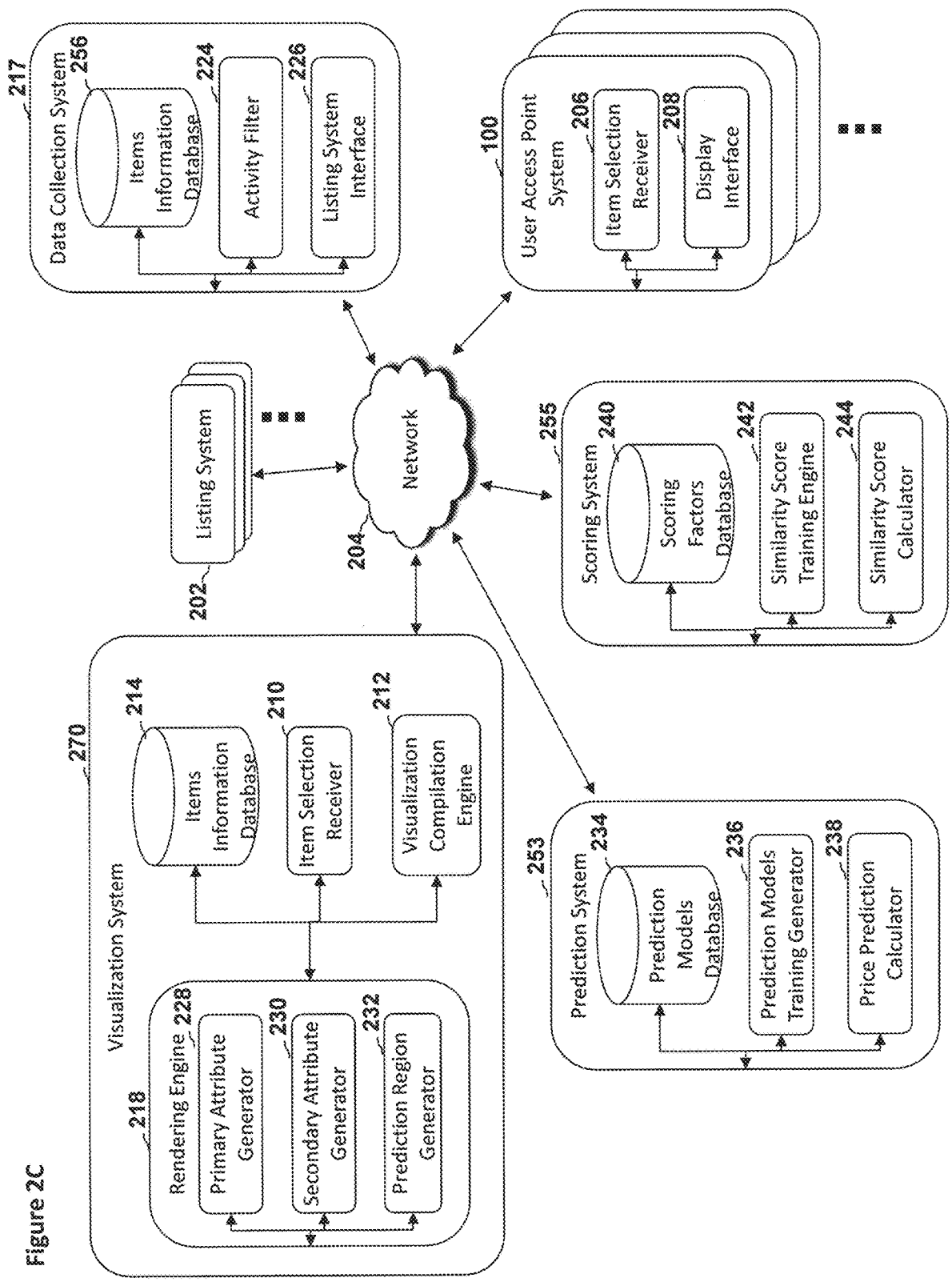
FIG. 2C is a block diagram depicting another embodiment of a visualization system in communication with one or more other systems.

FIG. 2C is a block diagram depicting another embodiment of a visualization system 270 in communication with one or more other systems. The visualization system 270 is similar to the visualization system 200 illustrated in FIG. 2A. However, the visualization system 270 is configured to utilize an external prediction system 253 and an external scoring system 255 to generate the prediction regions of the market position visualization and the similarity scores, respectively. The prediction system 253 is configured to operate similarly to the prediction engine 220, and the scoring system 255 is configured to operate similarly to the scoring engine 222.

Figure 2D:
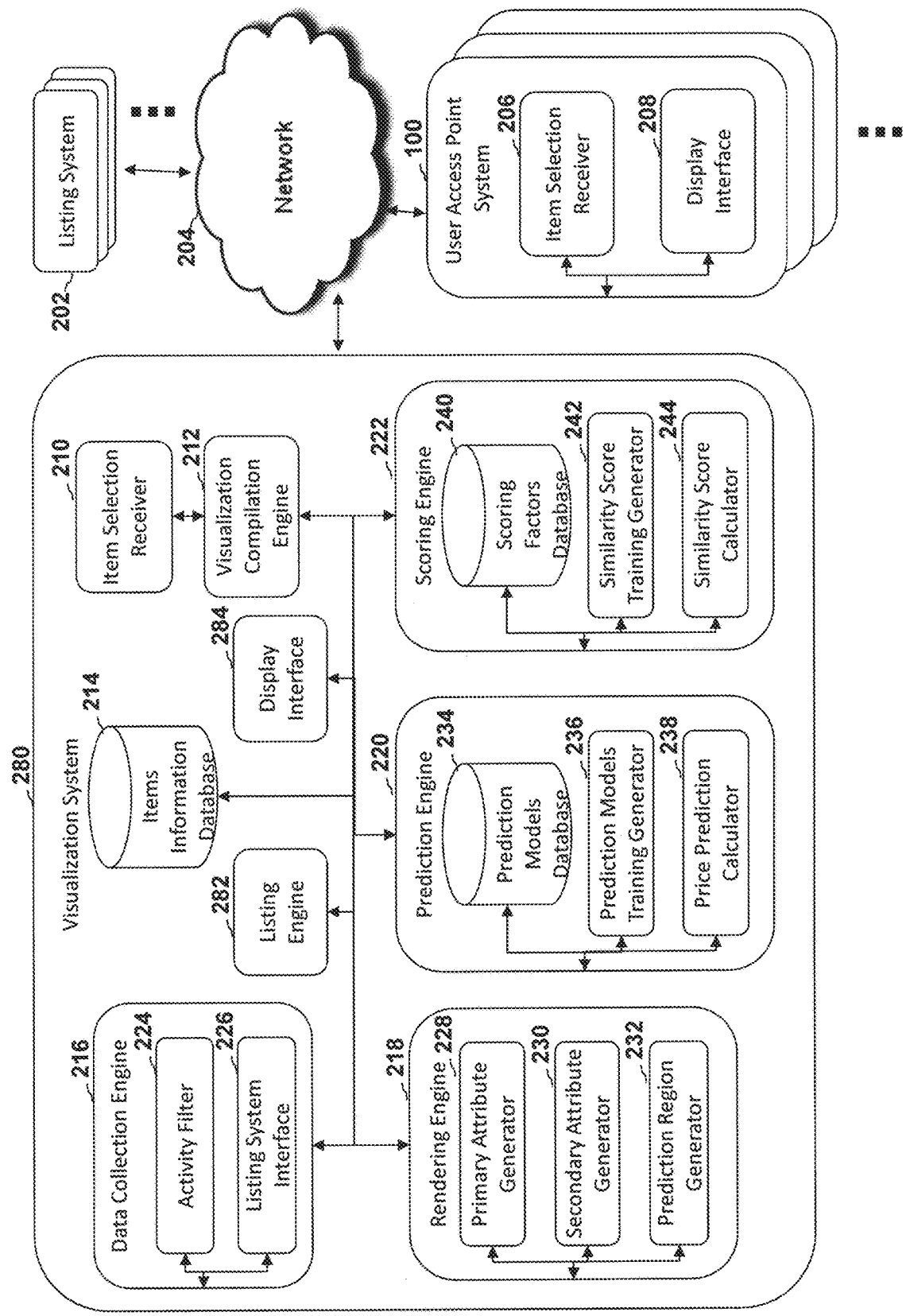
FIG. 2D is a block diagram depicting another embodiment of a visualization system in communication with one or more other systems.

FIG. 2D is a block diagram depicting another embodiment of a visualization system 280 in communication with one or more other systems. The visualization system 280 is similar to the visualization system 200 illustrated in FIG. 2A. However, the visualization system 280 adds a listing engine 282 and a display interface 284. In this embodiment, the visualization system 280 is able to allow users to directly interact with the visualization system 280 to interact with listings and/or to generate and view a market position visualization. For example, the listing engine 282 may perform functions similar to the plurality of listing systems 202. Additionally, the display interface 284 may perform functions similar to the display interface 208 of the user access point system 100. This embodiment illustrates an example that a visualization system, while in some embodiments communicates with other systems, in other embodiments does not have to necessarily communicate with any other systems to perform its intended functions.

Determining and Displaying Market Relative Positions and/or Attributes

Figure 3:
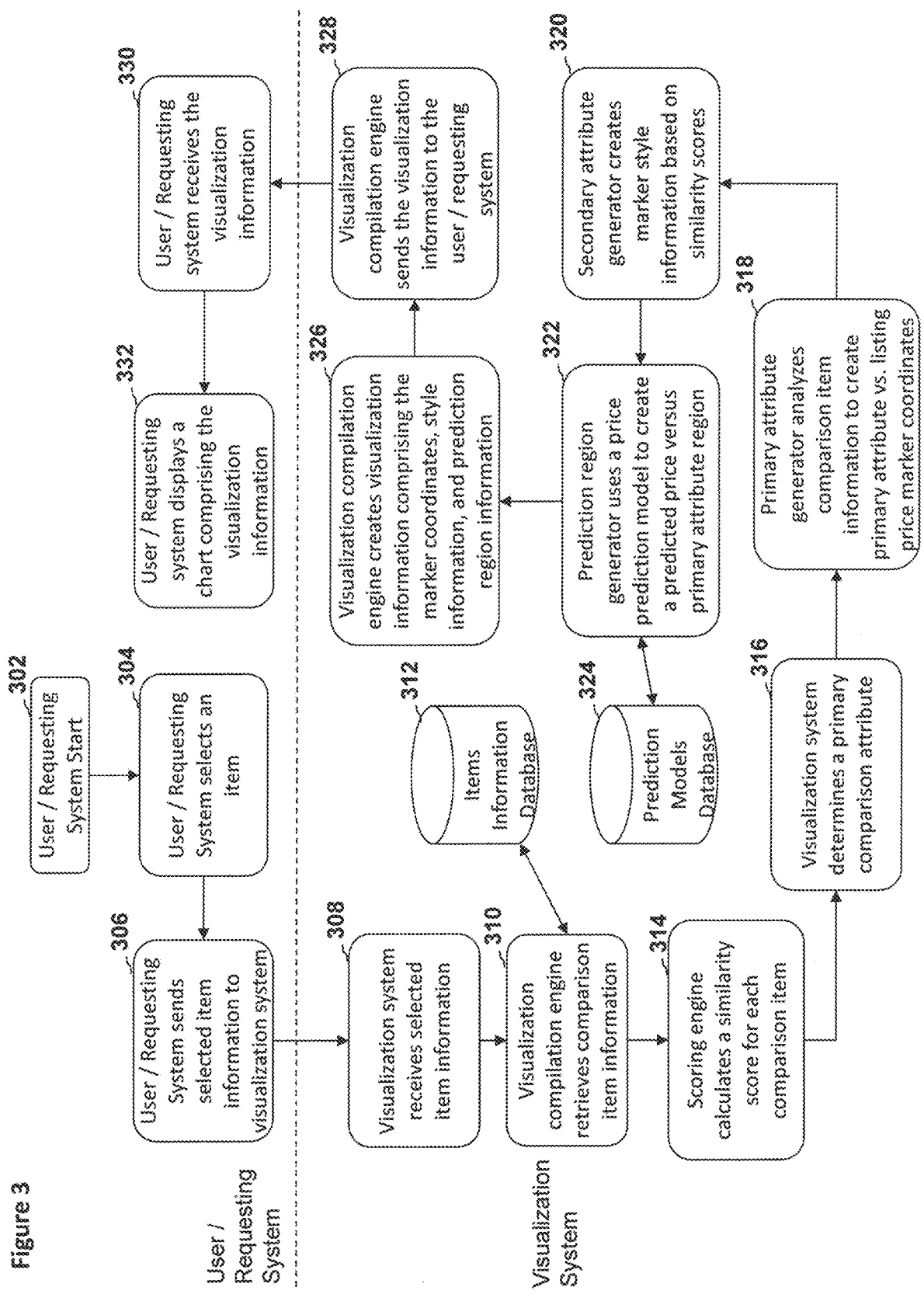
FIG. 3 depicts an embodiment of a process flow diagram illustrating an example of determining and displaying market relative attributes of unique items.

FIG. 3 depicts an embodiment of a process flow diagram illustrating an example of determining and displaying market relative attributes of unique items. The process flow illustrated in FIG. 3 may be performed by, for example, any of the systems illustrated in FIGS. 2A-2D. The process follow illustrated in FIG. 3 may be utilized to, for example, generate a market position visualization as illustrated in FIG. 1A based on a user's indication of a selected item. At block 302 the user or a requesting system starts the process. For example, a user may start the process using a user access point system 100. At block 304, the user or requesting system selects an item. For example, a display interface 208 of a user access point system 100 may be configured to enable a user to select a used vehicle from a list of used vehicles currently for sale. In another example, a requesting system not currently under the control of a user selects an item for the creation of a visualization. At block 306, the user or requesting system sends selected item information to a visualization system. For example, the user or requesting system may be configured to send information describing the selected item and/or to send an identifier of the selected item to a visualization system.

At block 308, the visualization system receives the selected item information. For example, the visualization system 200 illustrated in FIG. 2A may receive the selected item information through the electronic network 204 from the user access point system 100. In some embodiments, the visualization system may receive an identifier of a selected item and be required to retrieve additional information related to that item from, for example, the items information database 214. At block 310, the visualization compilation engine retrieves comparison item information. For example, the visualization compilation engine 212 may be configured to communicate with the items information database 214, illustrated as an items information database 312 in FIG. 3, to retrieve information related to a plurality of alternative or comparison unique items.

At block 314, a scoring engine calculates a similarity score for each comparison or alternative item. For example, the scoring engine 222 illustrated in FIG. 2A can be configured to utilize its similarity score calculator 244 to compare each alternative item's attributes to the attributes of the selected item to determine a similarity score for each item. An example similarity score calculation process is illustrated in FIG. 6, described below.

At block 316, the visualization system determines a primary comparison attribute. For example, the visualization system may determine that the primary comparison attribute is automobile mileage, as shown in the examples in FIGS. 1A and 1B. In some embodiments, the determination of this primary comparison attribute is set by an administrator of the system. In other embodiments, the determination of this primary comparison attribute is based on a selection of the user or requesting system. In other embodiments, the determination of the primary comparison attribute may be, at least in part, automatically determined based on the attributes of the selected and comparison items and/or the similarity calculation process at block 314.

At block 318, a primary attribute generator analyzes the comparison item information to create primary attribute versus listing price marker coordinates. For example, the primary attribute generator 228 illustrated in FIG. 2A may be configured to determine the listing price and primary attribute value for each comparison item and the selected item and to generate a pair of coordinates for each item indicating where that item's marker should be illustrated on the market position visualization.

At block 320, a secondary attribute generator creates marker style information based on the calculated similarity scores. For example, the secondary attribute generator 230 illustrated in FIG. 2A can be configured to analyze the similarity scores calculated at block 314 and to generate information to define how the marker for each item should be displayed on the market position visualization. For example, the secondary attribute generator 230 may generate information indicating the color each marker should be displayed as, the size of each marker, the shape or type of each marker, etc.

At block 322, a prediction region generator uses a price prediction model to create a predicted price versus primary attribute region. For example, the predicted region generator 232 illustrated in FIG. 2A may be configured to communicate with the prediction engine 220 and/or the prediction models database 234, illustrated as a prediction models database 234 in FIG. 3, to apply a prediction model to predict a selling price of an item based on its primary attribute value. For example, in generating the market position visualization illustrated in FIGS. 1A and 1B, the prediction region generator can be configured to generate a linear function defining a predicted selling price versus mileage. In some embodiments, the prediction region generator is further configured to take into account a margin of error or a range to apply around the exact predicted price to create a band having a certain width (as opposed to a line having zero width), as shown by the predicted price region 118 in FIG. 1A. In some embodiments, the prediction region generator can be configured to illustrate merely a line for the predicted price versus primary attribute. In other embodiments, an administrative setting can be configured to determine the range to illustrate around the exact predicted selling price. In some embodiments, the range of the predicted selling price region can, at least partially, be determined by analyzing the comparison item set in real-time or substantially real-time.

At block 326, a visualization compilation engine creates visualization information comprising the marker coordinates, style information, and prediction region information. For example, the visualization compilation engine 212 illustrated in FIG. 2A can be configured to create information describing the three types of information to be displayed by the market position visualization. The visualization compilation engine can be configured to compile X and Y coordinates for the first type of information, marker style information to illustrate the second type of information, and prediction region coordinates to illustrate the third type of information. In other embodiments, the visualization compilation engine can be configured to create more or less information, or different types of information, based on the types of information to be displayed and the number of types of information to be displayed.

At block 328, the visualization compilation engine sends the visualization information to the user or requesting system. For example, the visualization compilation engine 212 can be configured to send the visualization information through the electronic network 204 to the user access point system 100. At block 330, the user or requesting system receives the visualization information from the visualization system. At block 332, the user or requesting system displays a chart or other visualization comprising the visualization information. For example, the user or requesting system can be configured to display the market position visualization 110 as illustrated in FIGS. 1A and 1B.

FIG. 4A depicts another embodiment of a process flow diagram illustrating an example of determining and displaying market relative attributes of unique items. At block 402, a target product is provided. For example, a user can select a selected item using the item selection receiver 206 illustrated in FIG. 2A, and the user access point system 100 can be configured to electronically send information relating to that selected item or target product to the visualization system 200. At block 404, marketplace inventory is provided. For example, a visualization system 200 can be configured to store marketplace inventory information in its items information database 214. In some embodiments, the data collection engine 216 illustrated in FIG. 2A can be configured to gather marketplace inventory information from one or more listing systems 202. At block 408, a similarity score is computed relative to the target product for each of the alternative items in the marketplace or for a subset of the alternative items. For example, the scoring engine 222 illustrated in FIG. 2A can be configured to calculate a similarity score for each of a plurality of the alternative items in the marketplace.

At block 410, the alternative or comparison items are optionally sorted by their similarity scores and filtered. For example, the secondary attribute generator 230 illustrated in FIG. 2A can be configured to sort each of the comparison items in order of similarity and then to select a subset of those items that have scores indicating they are most similar to the target product. At block 412, a comparison set is provided. For example, the comparison set provided at block 412 may comprise the set of alternative or comparison items as filtered at block 410.

At block 406, a predictive model is provided. For example, the price prediction calculator 238 as illustrated in FIG. 2A can be configured to retrieve a price prediction model from the prediction models database 234.

At block 414, a market position visualization is rendered. For example, the rendering engine 218 illustrated in FIG. 2A can be configured to generate information describing the primary attribute versus price of each item, the similarity of each item to the target product, and the predicted price regions. This information can then be sent to, for example, a user access point system for display to a user.

FIG. 4B depicts another embodiment of a process flow diagram illustrating an example of determining and displaying market relative attributes of unique items. The process flow illustrated in FIG. 4B is similar to the process flow illustrated in FIG. 4A, except a predictive model is generated in this process flow in real-time or substantially in real-time based on an analysis of the comparison set, rather than being retrieved from a database of predetermined models. At block 420, a target product or selected item is provided. At block 422, a marketplace inventory is provided. At block 424, the similarity of each item in the inventory or a subset of the items in the inventory is calculated relative to the target product or selected item.

At block 426, the alternative items are optionally sorted by the similarity score and filtered to include the most similar items. At block 428, a comparison set is provided. For example, the comparison set may comprise the filtered set of alternative items created at block 426.

At block 430, the visualization system analyzes the comparison set of items to generate a price prediction model. This model may, in some embodiments, be generated in real-time or substantially in real-time using the concepts illustrated in FIG. 8 as described below.

At block 432 the predictive model that was generated at block 430 is provided. At block 434, a market position visualization is rendered. For example, the rendering engine 218 illustrated in FIG. 2A can be configured to determine information describing the three types of information for display in a market position visualization as illustrated in FIGS. 1A-1C. This information can then be sent to, for example, a user access point system for display to a user.

FIG. 5A depicts another embodiment of a process flow diagram illustrating an example of determining and displaying market relative attributes of unique items. The process flow begins at block 501. At block 502, a user or requesting system selects an item. For example, a user of a user access point system 100 as illustrated in FIG. 2A may select a unique item, such as a used vehicle, that the user is interested in. At block 503, the user or requesting system sends selected item information to a visualization system.

At block 504, the visualization system receives the selected item information. For example, the visualization system 200 illustrated in FIG. 2A may be configured to receive the selected item information electronically through the network 204 from the user access point system 100.

At block 505, the process flow varies depending on whether attributes of the selected item need to be retrieved. For example, in some embodiments, the user access point system 100 may be configured to send all relevant attributes of the selected item to the visualization system. In that example, the visualization system may not need to retrieve additional attributes, and the process flow would continue to block 508. However, in some embodiments, the user access point system may send only a subset of the relevant attributes to the visualization system and/or the user access point system may send an identifier of the selected item to the visualization system. In that case, the process flow proceeds to block 506.

At block 506, the visualization system retrieves attributes from an items information database. For example, the visualization system can be configured to utilize an identifier received from the user access point system to retrieve data related to the selected item from the items information database 214, illustrated as an items information database 507 in FIG. 5A. The process flow then proceeds to block 508.

At block 508, a visualization compilation engine optionally determines a comparison set criteria. For example, in some embodiments, the items information database may contain information related to various types of unique items such as cars, homes, collectible goods, etc. In some embodiments, rather than utilizing the entire inventory as a potential comparison set, the visualization compilation engine may optionally be configured to preliminarily narrow the set of items to consider. For example, the visualization compilation engine may be configured to only consider used automobiles as part of a comparison set when the selected item is a used automobile. In other examples, the criteria for an initial comparison set may be more specific, such as only including mini vans in the comparison set when a selected item is a minivan. In another example, a comparison set criteria may comprise only providing comparisons for homes within a certain number of miles from a selected home.

At block 509, the visualization compilation engine retrieves comparison item information. For example, the visualization compilation engine 212 illustrated in FIG. 2A can be configured to communicate with the items information database 214, illustrated as the items information database 507, to retrieve any relevant attribute information for each comparison set item. At block 510, the visualization system determines a primary comparison attribute. For example, the visualization system may determine that mileage is the primary comparison attribute for used vehicles. In other embodiments, the visualization system may determine that one or more other attributes should be the primary comparison attribute, based on an administrator setting or information received from the user. Examples of other potential primary attributes include, but are not limited to, age, square footage, condition, and/or the like. Although embodiments as described herein describe the x- and y-axis values as being generally continuous ranges (for example, 0 to 200,000 miles, with any number in that range being a potential x-axis value), other embodiments may use categories, exponential scales, and/or other nonlinear ranges. For example, a primary attribute may comprise a non-linear attribute such as car color, engine type, house construction type, and/or the like.

At block 511, a primary attribute generator analyzes the comparison item information to create primary attribute versus listing price marker coordinates. For example, the primary attribute generator 228 illustrated in FIG. 2A can be configured to analyze the comparison item information to determine the listing price of each comparison item and the value of each comparison item's primary attribute, such as mileage. The primary attribute generator can then be configured to generate a set of x-y coordinates for each of these items to enable positioning of a marker for each item in a market position visualization, such as the market position visualization 110 illustrated in FIG. 1A.

At block 512, a scoring engine calculates normalized probability, customization, condition, and/or status scores for single comparison item. For example, the scoring engine 222 illustrated in FIG. 2A can be configured to operate as illustrated in FIG. 6 as further described below to calculate these normalized scores. The scoring engine may be configured to communicate with a scoring factors database 513 to retrieve scoring factors for use in the scoring calculations. At block 514, the scoring engine calculates a similarity score for the comparison item. For example, as further illustrated in FIG. 6, the scoring engine can be configured to combine the normalized scores to generate a single similarity score.

At block 515, the process flow varies depending on whether there are more alternative or comparison items to analyze. If there are more alternative items to analyze, the process flow proceeds back to block 512 and proceeds as described above. If, at block 515, there are no more comparison items to analyze, the process flow proceeds to block 516.

At block 516, a visualization compilation engine optionally sorts and/or filters the comparison items. For example, the visualization compilation engine 212 illustrated in FIG. 2A can be configured to sort the comparison items by their respective similarity scores and/or to eliminate some of the comparison items that are, for example, less similar to the target item. In some embodiments, block 516 is not performed and the entire set of comparison items is utilized.

At block 517, a secondary attribute generator creates marker style information based on the similarity scores. For example, the secondary attribute generator illustrated in FIG. 2A can be configured to generate information defining how a marker should be displayed (for example, its color, shape, etc.) based on its similarity score.

At block 518, a prediction region generator retrieves a price prediction model. For example, the prediction region generator can be configured to communicate with the prediction models database shown at block 519 to retrieve a previously calculated prediction model. At block 520, the prediction region generator applies the price prediction model to create predicted price region versus primary attribute region information. For example, the price prediction region generator 232 illustrated in FIG. 2A may be configured to communicate with the price prediction calculator 238 to apply the prediction model and to generate a function describing a predicted selling price versus primary attribute line (which may or may not be shown on an electronic visualization). In some embodiments, the prediction region generator additionally defines a magnitude or size of a region around the predicted price line.

At block 521, the visualization compilation engine creates visualization information comprising the marker coordinates, style information, and prediction region information. For example, the visualization compilation engine 212 can be configured to compile the information generated by the primary attribute generator, secondary attribute generator, and prediction region generator into a single set of information for generating a market position visualization. In some embodiments, the visualization compilation engine can be configured to further incorporate information for display relating to the market position visualization, such as for the legend 112 and heading 108 shown in FIG. 1A.

At block 522, the visualization compilation engine sends the visualization information to the user or requesting system. At block 523, the user or requesting system receives the visualization information from the visualization system. At block 524, the user or requesting system displays and enables interaction with a chart comprising the visualization information. For example, the user access point system 100 illustrated in FIG. 1A can be configured to illustrate the market position visualization 110 utilizing the information from the visualization system 200. In some embodiments, the user access point system 100 can be configured to enable a user to interact with the visualization by, for example, selecting alternative items to find out additional information about those items.

In some embodiments, a visualization system is configured to render a visualization prior to sending the visualization information to a user access point system. For example, the visualization system can be configured to generate a JPEG file, a vector graphic file, and/or the like for sending to the user access point system. In other embodiments, a visualization system can be configured to send information to a user access point system to enable the user access point system to render the visualization. For example, the visualization system can be configured to send data indicating marker coordinates, marker styles, etc. to enable the user access point system to render a visualization.

Figure 5B:
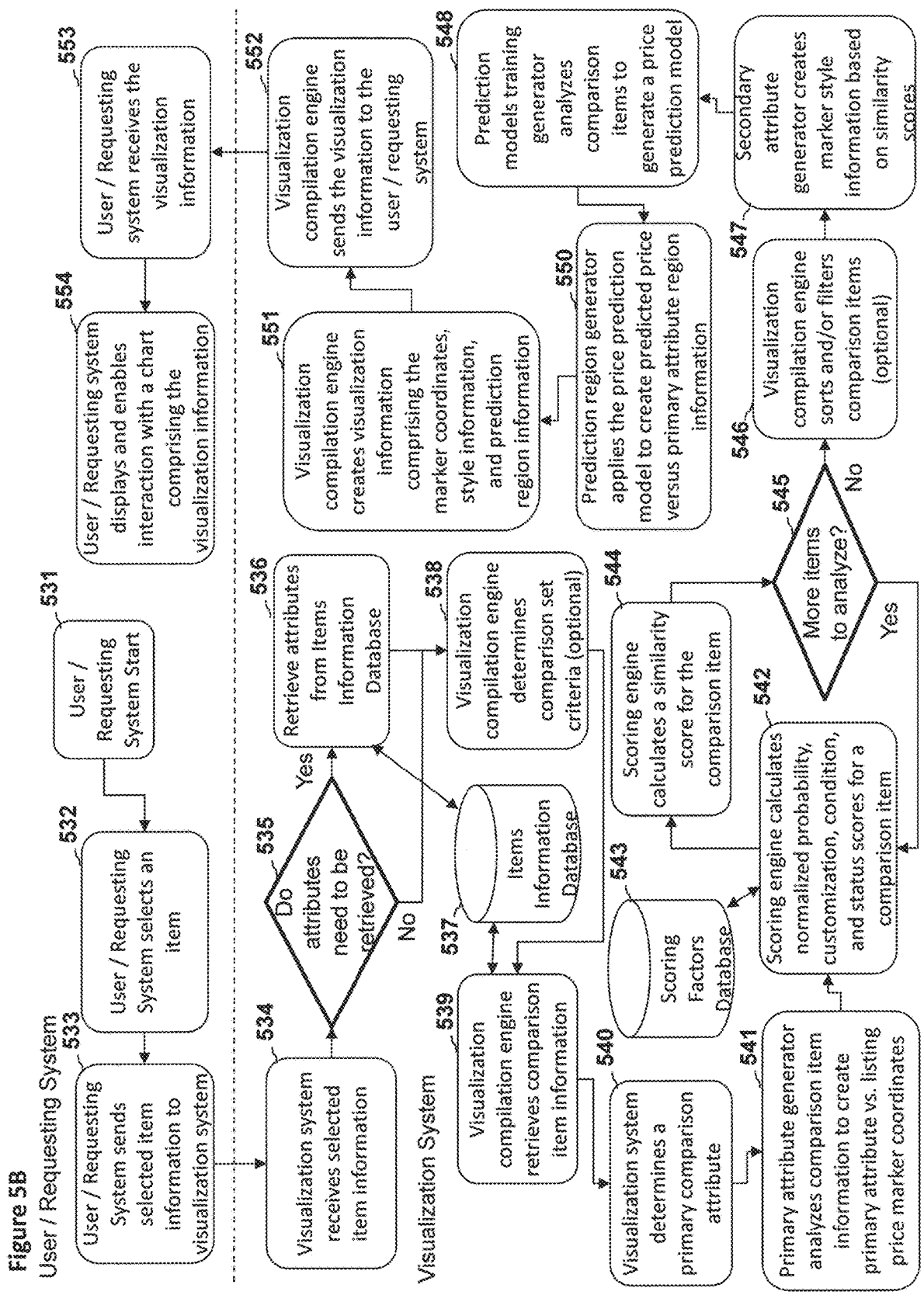
FIG. 5B depicts another embodiment of a process flow diagram illustrating an example of determining and displaying market relative attributes of unique items.

FIG. 5B depicts another embodiment of a process flow diagram illustrating an example of determining and displaying market relative attributes of unique items. The process flow illustrated in FIG. 5B is similar to the process flow illustrated in FIG. 5A, except the process flow illustrated in FIG. 5B comprises generating prediction models in real-time or substantially in real-time based on an analysis of the comparison item set, rather than, or in addition to, retrieving pre-generated prediction models.

The process flow begins at block 531. At block 532, a user or requesting system selects an item. At block 533, the user or requesting system sends the selected item information to the visualization system. At block 534, the visualization system receives the selected item information. At block 535, the process flow varies depending on whether attributes of the selected item need to be retrieved. If attributes of the selected item need to be retrieved, the process flow proceeds to block 536. At block 536, the visualization system retrieves any required attributes of the selected item from the items information database illustrated at block 537. After attributes have been retrieved, or if attributes do not need to be retrieved, the process flow continues to block 538.

At block 538, a visualization compilation engine determines a comparison set criteria. This optional block can be used to pare down or reduce the size of a comparison set prior to performing additional calculations on the comparison set. At block 539, the visualization compilation engine retrieves comparison item information. For example, the visualization compilation engine can be configured to retrieve information related to a plurality of alternative or comparison items from the items information database shown at block 537.

At block 540, the visualization system determines a primary comparison attribute, such as mileage of a used vehicle. At block 541, a primary attribute generator analyzes the comparison item information to create primary attribute versus listing price marker coordinates. These coordinates can be utilized by, for example, a user access point system to illustrate the first type of information illustrated by a market position visualization, namely price versus primary attribute.

At block 542, a scoring engine calculates normalized probability, customization, condition, and status scores for a comparison item. In calculating these scores, the scoring engine is configured to communicate with a scoring factors database shown at block 543 to retrieve any required scoring factors. At block 544, the scoring engine calculates a similarity score for the comparison item, by combining the various scores calculated at block 542. At block 545, the process flow depends on whether there are additional comparison items to analyze. If there are, the process flow proceeds back to block 542 and proceeds as described above. If there are no more items to analyze at block 545, the process flow proceeds to block 546.

At block 546, the visualization compilation engine optionally sorts and/or filters the comparison items. For example, the visualization compilation engine can sort the comparison items by their calculated similarity scores and/or remove some items that have a lower similarity to the target item.

At block 547, a secondary attribute generator creates marker style information based on the similarity scores. For example, a secondary attribute generator can be configured to generate information indicating how a marker for each item should be illustrated, such as its color, size, shape, etc. This information defines how the second type of information illustrated by a market position visualization will be shown.

At block 548, a prediction models training generator analyzes comparison items to generate a price prediction model in real-time or substantially in real-time. For example, the prediction models training generator 236 illustrated in FIG. 2A can be configured to analyze the comparison items in the comparison set to generate a prediction model that can be utilized to predict a selling price versus primary attribute for the items. One example of a process for generating this model is illustrated in FIG. 8, as further described below.

At block 550, a prediction region generator applies the price prediction model to create predicted price versus primary attribute region information. For example, the prediction region generator 232 illustrated in FIG. 2A can be configured to generate a line and/or a band for illustration on a market position visualization that indicates items having a listing price falling within the predicted listing price based on their primary attribute value.

At block 551, the visualization compilation engine creates visualization information comprising the marker coordinates, style information, and prediction region information. For example, the visualization compilation engine 212 illustrated in FIG. 2A can be configured to compile all of the information required to enable a market position visualization to illustrate all three types of information as shown in the examples in FIGS.

At block 552, the visualization compilation engine sends the visualization information to the user or requesting system. At block 553, the user or requesting system receives the visualization information. At block 554, the user or requesting system displays and optionally enables interaction with a chart comprising the visualization information. For example, the user or requesting system illustrates the market position visualizations illustrated in FIGS. 1A-1C and optionally enables a user to interact with those visualizations.

Figure 5C:
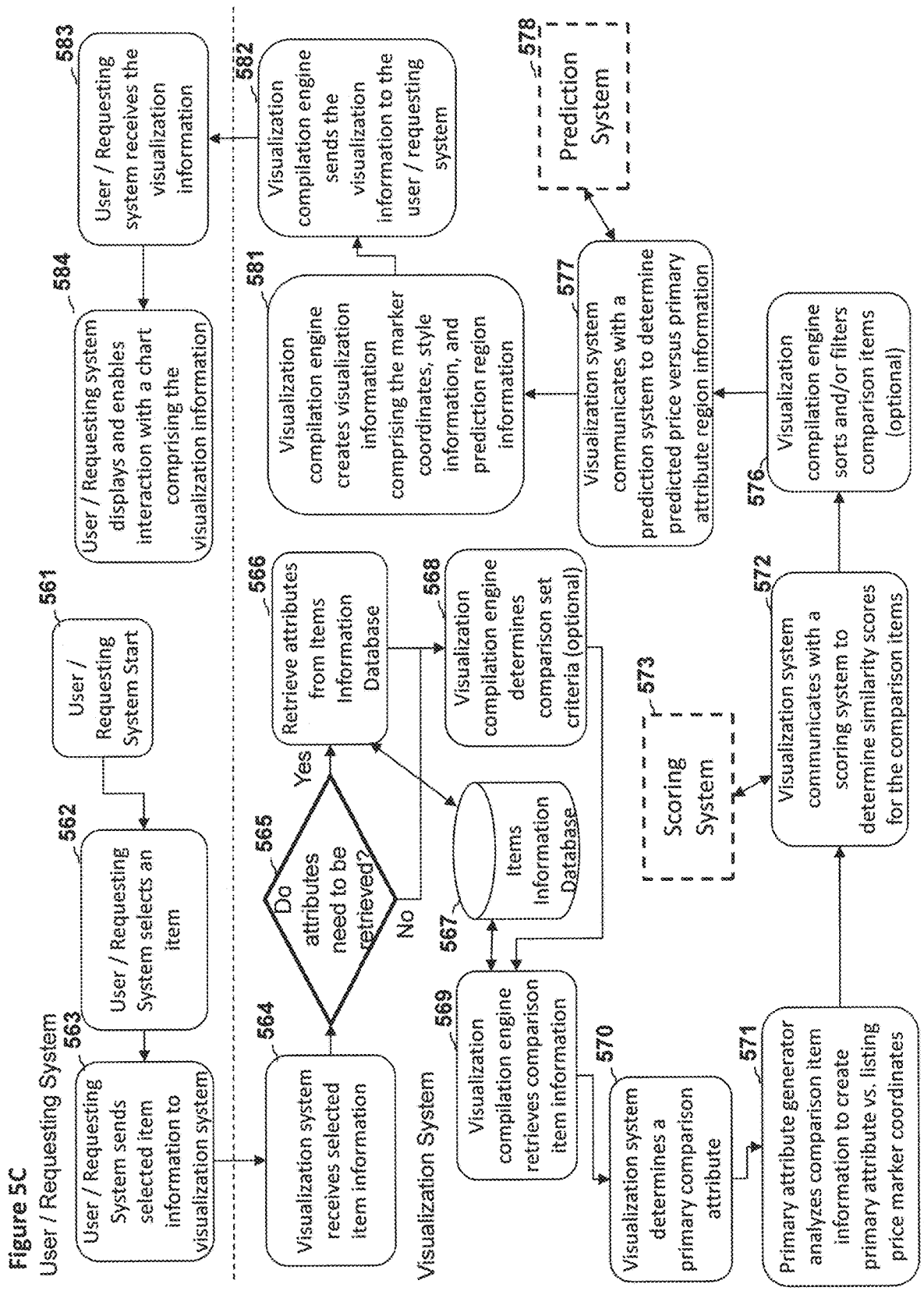
FIG. 5C depicts another embodiment of a process flow diagram illustrating an example of determining and displaying market relative attributes of unique items.

FIG. 5C depicts another embodiment of a process flow diagram illustrating an example of determining and displaying market relative attributes of unique items. The process flow illustrated in FIG. 5C is similar to the process flow illustrated in FIG. 5A, except the process flow illustrated in FIG. 5C illustrates a process wherein a visualization system communicates with external scoring and prediction systems to calculate similarity scores and price prediction information, rather than utilizing the visualization system to calculate that information. Such a process flow as shown in FIG. 5C may be implemented by, for example, the visualization system 270 illustrated in FIG. 2C.

At block 561, the process flow begins. At block 562, a user or requesting system selects an item. At block 563, the user or requesting system sends selected item information to the visualization system. At block 564, the visualization system receives the selected item information. At block 565, the process flow varies depending on whether attributes for the selected item need to be retrieved. If not, the process flow continues to block 568. If additional attributes need to be retrieved, the process flow proceeds to block 566. At block 566, the visualization system retrieves attributes of the selected item from the items information database illustrated at block 567. The process flow then proceeds to block 568.

At block 568, the visualization compilation engine optionally determines a comparison set criteria, to optionally reduce the size of the comparison set prior to performing similarity calculations. At block 569, the visualization compilation engine retrieves comparison item information. For example, the visualization compilation engine 212 illustrated in FIG. 2B can be configured to communicate with the items information database shown at block 567 to retrieve attribute information for the various comparison items.

At block 570, the visualization system determines a primary comparison attribute. For example, the visualization system determines that the primary comparison attribute should be mileage of a used vehicle. At block 571, the primary attribute generator analyzes comparison item information to create primary attribute versus listing price marker coordinates. This information can be used to illustrate the first type of information on a market position visualization, namely primary attribute versus price information.

At block 572, the visualization system communicates with an external scoring system 573 to determine similarity scores for the comparison items. For example, the visualization system 270 illustrated in FIG. 2C can be configured to communicate through the network 204 with the scoring system 255 to determine similarity scores for each comparison item as compared to the selected item. At block 576, the visualization compilation engine optionally sorts and/or filters the comparison items based on their respective similarity scores.

At block 577, the visualization system communicates with an external prediction system 578 to determine predicted price versus primary attribute region information. For example, the visualization system 270 can be configured to electronically communicate through the network 204 with the prediction system 253 to determine information defining the predicted price region.

At block 581, the visualization compilation engine creates visualization information comprising the marker coordinates, marker style information, and prediction region information. This information comprises the three types of information for display in a market position visualization as illustrated in FIGS. 1A-1C. At block 582, the visualization compilation engine sends the visualization information to the user or requesting system. At block 583, the user or requesting system receives the visualization information from the visualization system. At block 584, the user or requesting system displays and optionally enables interaction with a chart or other visualization comprising the visualization information, as illustrated in FIGS. 1A-1C.

Determining Similarity

FIG. 6 depicts an embodiment of a process flow diagram illustrating an example of calculating similarity scores for alternative or comparison unique items. Although the process flow illustrated in FIG. 6 depicts one way of calculating similarity scores, the systems, methods, and devices as described herein may utilize various different methods of determining a similarity of a comparison item to a selected item. For example, U.S. application Ser. No. 13/927,513, incorporated by reference herein, describes various methods of calculating similarity scores, any of which may be utilized by a visualization system.

The visualization system begins the process at block 602. At block 604, the visualization system determines a selected item and a comparison item set. For example, the visualization system 200 illustrated in FIG. 2A may be configured to receive a selected item from a user access point system and to determine a set of alternative or comparison items to compare to that selected item, as further described above. At block 606, the visualization system sends the selected item and comparison item information to a scoring system. Note that, although the process flow illustrated in FIG. 6 comprises a visualization system utilizing an external scoring system for calculating scores, such as is shown in FIG. 2C, the same concepts as described with respect to FIG. 6 may be utilized by various other systems. For example, the visualization system 200 illustrated in FIG. 2A may utilize the same concepts by using its scoring engine 222, rather than a scoring system.

At block 608, the scoring system receives the selected and comparison item information from the visualization system. At block 610, a similarity score calculator decomposes the selected item. For example, the similarity score calculator 244 illustrated in FIG. 2C can be configured to analyze information describing the selected item to decompose it into its various attributes, such as condition attributes, status attributes, customization attributes, and/or the like.

At block 612, the similarity score calculator decomposes a comparison item. For example, the similarity score calculator 244 can be configured to decompose the first comparison item similar to how it decomposed the selected item at block 610.

At block 614, the similarity score calculator generates a probability score. For example, the similarity score calculator may be configured to communicate with a prototype factor database shown at block 616 to retrieve prototype factors and to utilize, for example, a collaborative filter to calculate a probability that a user interested in the selected item would be interested in the comparison item.

At block 618, the similarity score calculator generates a customization score. For example, the similarity score calculator can be configured to retrieve customization factors from the customization factor database shown at block 620 and to apply those factors to the customization attributes of the selected item and comparison item to generate a customization score. Note that the factors stored in the prototype factor database 616, customization factor database 620, condition factor database 624, and status factor database 628 can be generated using various methods, with one method illustrated in FIG. 7 as described further below.

At block 622, the similarity score calculator generates a condition score. For example, the similarity score calculator can be configured to retrieve one or more condition factors from the condition factor database shown at block 624 and to apply those factors to the condition attributes of the selected item and comparison item to determine a condition score.

At block 626, the similarity score calculator generates a status score. For example, the similarity score calculator can be configured to retrieve one or more status factors from the status factor database illustrated at block 628, and to apply those factors to the status attributes of the selected item and comparison item to generate a status score.

At block 630, the similarity score calculator normalizes one or more of the four scores generated in previous blocks. At block 632, the similarity score calculator generates a similarity score by combining the four normalized scores.

At block 634, the process flow varies depending on whether there are more items to analyze. If not, the process flow continues to block 636. If there are more items to analyze, the process flow proceeds back to block 612 and continues as described above. At block 636, the scoring system sends the calculated similarity scores for the comparison or alternative items to the visualization system. At block 638, the visualization system receives the similarity scores from the scoring system. At block 640, the visualization system generates visualization information based on the similarity scores as described above with reference to, for example, FIG. 3, FIGS. 4A-4B, and FIGS. 5A-5C.

FIG. 7 depicts an embodiment of a process flow diagram illustrating an example of determining various factors for use in a similarity score calculation process. For example, the process flow illustrated in FIG. 7 can be utilized to generate the factors utilized by the process flow shown in FIG. 6 in calculating similarity scores. Although the process flow in FIG. 7 illustrates one method of generating similarity scoring factors, various other methods may be used. U.S. application Ser. No. 13/927,513, incorporated herein by reference, illustrates some of the other methods of calculating similarity scoring factors, for example, the process flow shown in FIG. 10 of the '513 Application.

Although the process flow of FIG. 7 will be described with respect to the systems illustrated in FIG. 2C, the concepts shown in FIG. 7 may be utilized with various embodiments of systems as described herein. At block, 702, users interact with item listings. For example, the plurality of item listing systems 202 illustrated in FIG. 2C may enable users to interact with listings of, for example, used vehicles or homes listed on their websites. At block 704, the various item listing systems log details of the user interactions. For example, the listing systems 202 can be configured to log information based on what listings a user indicates a preference for, what listings a user clicks on, what listings a user compares to other listings, which listings a user purchases, which listings a user indicates a dislike for, etc. In some embodiments, the item listing systems can be configured to store this information in a training data database illustrated at block 706.

At block 708, a training engine communicates with the training data database shown at block 706 to extract all pairs of listings viewed by a single user. For example, the similarity score training engine 242 illustrated in FIG. 2C can be configured to analyze the data in the training data database and to determine which listings were viewed by the same users. At block 710, the training engine decomposes the items in each pair. For example, the similarity score training engine 242 can be configured to analyze the items that were the subject of each listing to determine their relevant attributes, such as condition, status, and customization attributes.

At block 712, the process flow varies depending on whether there is additional user data from the training data database to analyze. If there is, the process flow proceeds back to block 708 and proceeds as described above. If there is no additional user data to analyze at block 712, the process flow proceeds as shown to blocks 716, 724, 734, and 746.

At block 716, the training engine calculates prototype factors using one or more collaborative filtering algorithms. For example, the similarity score training engine 242 can be configured to analyze the tracked user data and attributes of each item in the pairs and to apply a collaborative filtering algorithm to calculate prototype factors. At block 718, the training engine stores these prototype factors in a prototype factor database shown at block 720. Although the scoring system 255 illustrated in FIG. 2C illustrates one scoring factors database 240, that scoring factors database 240 may comprise the various databases illustrated as scoring system databases in FIG. 7.

At block 724, the training engine combines status data from multiple users. At block 726, the training engine computes a covariance matrix based on the various status information. At block 728, the training engine stores the covariance values in the status factor database shown at block 730.

At block 734, the training engine determines values for some or all price driver attributes of the items or listings viewed by users. For example, the training engine can be configured to determine the value that particular attributes of the items add to a selling price of the item. At block 736, the training engine combines customization data from multiple users. At block 738, the training engine computes a covariance matrix based on this combined data. At block 740, the training engine stores the covariance values in the customization factor database illustrated at block 742.

At block 746, the training engine determines user specific mean values based on the decomposed information from block 710. At block 748, the training engine computes relative changes from the user specific mean values. At block 750, the training engine combines condition data from multiple users. At block 752, the training engine computes a covariance matrix based on this combined information. At block 754, the training engine stores the covariance values in the condition factor database illustrated at block 756.

Creating Prediction Models

FIG. 8 depicts an embodiment of a process flow diagram illustrating an example of creating one or more prediction models. Although the process flow illustrated in FIG. 8 will be described with respect to the systems illustrated in FIG. 2C, the concepts illustrated herein may be utilized by any of the systems as described herein. Further, the process flow illustrated in FIG. 8 illustrates one embodiment of a process flow for creating one or more prediction models. Prediction models may be created in various other ways, including, but not limited to, the various model creation methods disclosed in U.S. application Ser. No. 13/924,375, incorporated by reference herein.

The process flow begins at block 802 when users interact with item listings. For example, users may interact with a plurality of unique item listings on the plurality of listing systems 202 illustrated in FIG. 2C. At block 804, the plurality of item listing systems log details of these user interactions. In some embodiments, the details are logged to the user activity database illustrated at block 806. At block 808, an activity filter of a data collection system merges the user activity logs from the various listing systems. For example, the activity filter 224 illustrated in FIG. 2C may be configured to communicate with the user activity database shown at block 806 and to merge the information from various item listing systems.

At block 810, the activity filter retrieves item attribute data for items related to the activity logs. For example, the information received from the item listing systems in some embodiments may not include all of the relevant item attribute data, and the data collection system may be configured to retrieve some of this information from another source. For example, the activity filter may be configured to communicate with the items information database illustrated at block 812, which may be the items information database 256, to retrieve any missing information related to attributes of the items related to the activity logs.

At block 814, the activity filter retrieves a position bias model from a position bias models database illustrated at block 816. A position bias model may be utilized to, for example, eliminate or reduce an effect that the position in which a listing shows up in a compilation of listings may have on a user selecting or otherwise indicating an interest in that item.

At block 818, the activity filter analyzes the logged data to generate product data with user activity data. For example, the activity filter may be configured to combine the merged user activity log with the item attribute data retrieved at block 810 and the position bias model retrieved at block 814 to determine a relative performance of each item that was viewed by one or more users. At block 820, the activity filter stores the product data with user activity data in the product activity database illustrated at block 822.

At block 824, the activity filter analyzes the logged data to generate geographic market data. For example, the activity filter may be configured to combine the merged user activity log with the item attribute data retrieved at block 810 and the position bias model retrieved at block 814 and to analyze this information to generate geographic market data. At block 826, the activity filter stores the geographic market data in the market data database 828.

At block 830, a training generator of a prediction system retrieves a prediction model specification from a specifications database illustrated at block 832. For example, the prediction models training generator 236 illustrated in FIG. 2C can be configured to retrieve a model specification from the specifications database. The model specification may comprise, for example, an identification of the explanatory and response variables to be considered, the modeling approach, and the product or item attributes that should be considered in generating a prediction model.

At block 834, the training generator applies the specification to the stored product and market data to create a price prediction model. For example, the training generator may be configured to retrieve the product data with user activity data from the product activity database shown at block 822 and the geographic market data shown at block 828 and to apply the prediction model specification to this data to generate a prediction model. In some embodiments, the training generator may use regression techniques, nearest neighbor techniques, and/or other techniques to create the price prediction model. At block 836, the training generator stores the price prediction model in the prediction models database shown at block 838, which may be the prediction models database 234 illustrated in FIG. 2C. These prediction models can then be later used by, for example, the price prediction calculator 238 illustrated in FIG. 2C for generation of predicted prices based on a primary attribute.

Computing System

Figure 9:
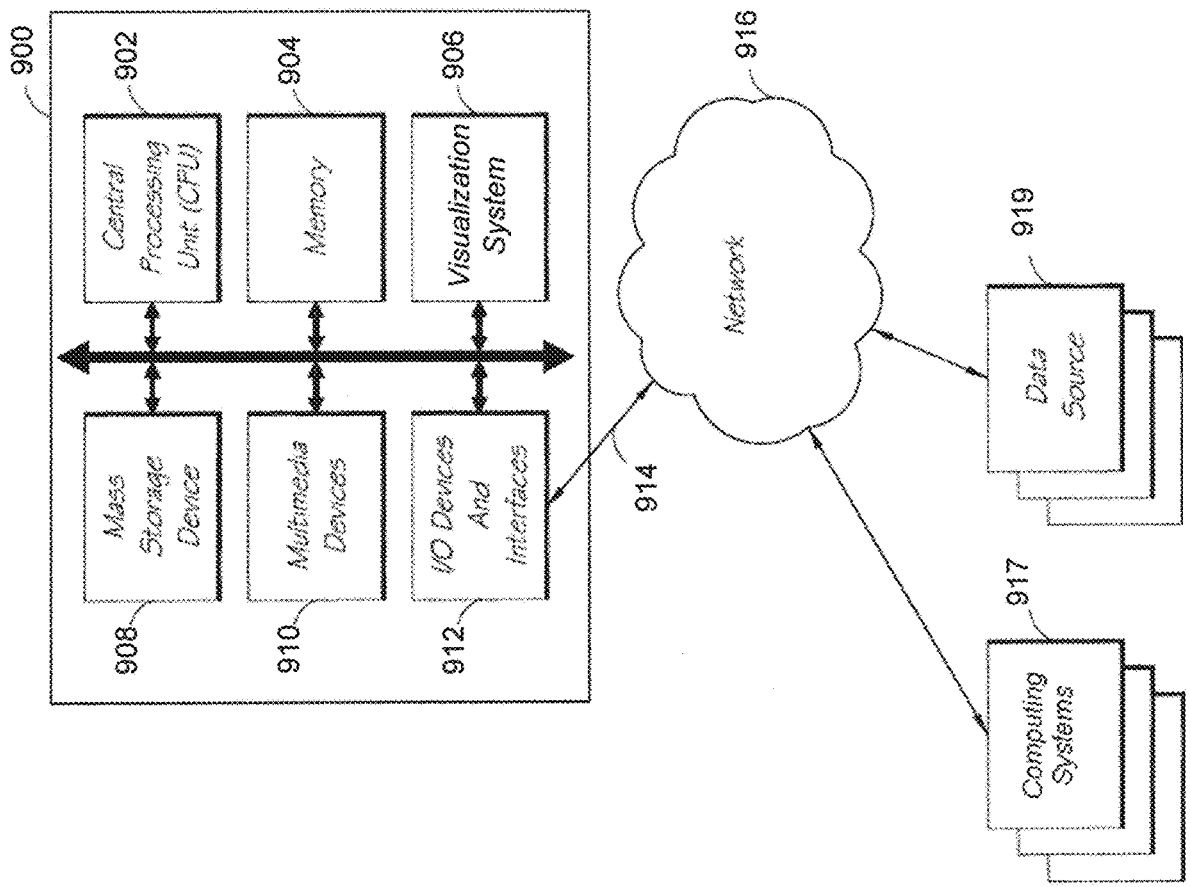
FIG. 9 is a block diagram depicting an embodiment of a computer hardware system configured to run software for implementing one or more embodiments of the visualization systems and other systems described herein.

FIG. 9 is a block diagram depicting an embodiment of a computer hardware system configured to run software for implementing one or more embodiments of the visualization systems described herein.

In some embodiments, the computer clients and/or servers described above take the form of a computing system 900 illustrated in FIG. 9, which is a block diagram of one embodiment of a computing system that is in communication with one or more computing systems 917 and/or one or more data sources 919 via one or more networks 916. The computing system 900 may be used to implement one or more of the systems and methods described herein. In addition, in one embodiment, the computing system 900 may be configured to manage access or administer a software application. While FIG. 9 illustrates one embodiment of a computing system 900, it is recognized that the functionality provided for in the components and modules of computing system 900 may be combined into fewer components and modules or further separated into additional components and modules.

Visualization System Module

In one embodiment, the computing system 900 comprises a visualization system module 906 that carries out the functions described herein with reference to determining and displaying market relative attributes or position of unique items, including any one of techniques described above. In some embodiments, the computing system 900 additionally comprises a data collection engine, rendering engine, prediction engine, scoring engine, activity filter, listing system interface, primary attribute generator, secondary attribute generator, prediction region generator, production models training generator, price prediction calculator, similarity score training generator, similarity score calculator, item selection receiver, visualization compilation engine, listing engine, and/or display interface that carries out the functions described herein with reference to determining and displaying visualizations. The visualization system module 906 and/or other modules may be executed on the computing system 900 by a central processing unit 902 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 900 also comprises a mainframe computer suitable for controlling and/or communicating with large databases, performing high volume transaction processing, and generating reports from large databases. The computing system 900 also comprises a central processing unit ("CPU") 902, which may comprise a conventional microprocessor. The computing system 900 further comprises a memory 904, such as random access memory ("RAM") for temporary storage of information and/or a read only memory ("ROM") for permanent storage of information, and a mass storage device 908, such as a hard drive, diskette, or optical media storage device. Typically, the modules of the computing system 900 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 900 comprises one or more commonly available input/output (I/O) devices and interfaces 912, such as a keyboard, mouse, touchpad, and printer. In one embodiment, the I/O devices and interfaces 912 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 912 comprise a microphone and/or motion sensor that allow a user to generate input to the computing system 900 using sounds, voice, motion, gestures, or the like. In the embodiment of FIG. 9, the I/O devices and interfaces 912 also provide a communications interface to various external devices. The computing system 900 may also comprise one or more multimedia devices 910, such as speakers, video cards, graphics accelerators, and microphones, for example.

Computing System Device/Operating System

The computing system 900 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 900 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 900 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 9, the computing system 900 is coupled to a network 916, such as a LAN, WAN, or the Internet, for example, via a wired, wireless, or combination of wired and wireless, communication link 914. The network 916 communicates with various computing devices and/or other electronic devices via wired or wireless communication links. In the embodiment of FIG. 9, the network 916 is communicating with one or more computing systems 917 and/or one or more data sources 919.

Access to the visualization system module 906 of the computer system 900 by computing systems 917 and/or by data sources 919 may be through a web-enabled user access point such as the computing systems' 917 or data source's 919 personal computer, cellular phone, smartphone, laptop, tablet computer, e-reader device, audio player, or other device capable of connecting to the network 916. Such a device may have a browser module that is implemented as a module that uses text, graphics, audio, video, and other media to present data and to allow interaction with data via the network 916.

The browser module may be implemented as a combination of an all points addressable display such as a cathoderay tube (CRT), a liquid crystal display (LCD), a plasma display, or other types and/or combinations of displays. In addition, the browser module may be implemented to communicate with input devices 912 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 900 may comprise a physical or logical connection established between a remote microprocessor and a mainframe host computer for the express purpose of uploading, downloading, or viewing interactive data and databases on-line in real time. The remote microprocessor may be operated by an entity operating the computer system 900, including the client server systems or the main server system, and/or may be operated by one or more of the data sources 919 and/or one or more of the computing systems 917. In some embodiments, terminal emulation software may be used on the microprocessor for participating in the micro-mainframe link.

In some embodiments, computing systems 917 who are internal to an entity operating the computer system 900 may access the visualization system module 906 internally as an application or process run by the CPU 902.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in FIG. 9, the network 916 may communicate with other data sources or other computing devices. The computing system 900 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A computer-implemented method for generating and updating an interactive market relative position visualization interface, the computer-implemented method comprising:

maintaining, by a computer system, one or more electronic data stores that store information relating to a plurality of unique items currently and previously offered for sale;

generating, by the computer system, a predicted selling price model by analyzing a plurality of attributes of at least a portion of the plurality of unique items for which information is stored in the one or more electronic data stores;

transmitting, from the computer system to a user device, data that causes rendering of an interactive visualization interface, the interactive visualization interface comprising at least a selectable listing;

receiving, by the computer system, an indication of a user selection made via the interactive visualization interface;

determining, by the computer system, a set of comparison items, wherein the set of comparison items comprises a subset of the plurality of unique items for which information is stored in the one or more electronic data stores, the set of comparison items comprising unique items having one or more attributes that are the same or similar to attributes associated with the user selection;

determining, by the computer system, sets of marker coordinates for comparison items in the set of comparison items, wherein each set of marker coordinates comprises a primary attribute value for the respective comparison item and a listing price for the respective comparison item;

generating, using the predicted selling price model, data for displaying a predicted selling price indicator that illustrates a price range as a function of the primary attribute;

transmitting, from the computer system to the user device, data that causes re-rendering of the interactive visualization interface such that the interactive visualization interface comprises:
- a two-axis plot comprising:
  - a plurality of markers corresponding to the sets of marker coordinates for comparison items; and
  - the predicted selling price indicator that illustrates a price range as a function of the primary value; and
- a selectable listing that enables additional user selections that can cause additional re-rendering of the interactive visualization interface.

2. The computer-implemented method of claim 1, wherein the plurality of markers are interactive markers configured to trigger a visible popup dialogue responsive to being interacted with via the user device, the visible popup dialogue comprising information based on the stored information.

3. The computer-implemented method of claim 1, further comprising:

receiving, by the computer system, an indication of a Previously presented user selection made via the interactive visualization interface; and transmitting, from the computer system to the user device, data that causes re-rendering of the interactive visualization interface such that at least the plurality of markers are based on a Previously presented set of comparison items associate with the Previously presented user selection.

4. The computer-implemented method of claim 1, wherein the attributes associated with the user selection comprise attributes associated with vehicles.

5. The computer-implemented method of claim 4, wherein the attributes associated with the user selection comprise attributes associated with at least a vehicle make and a vehicle model.

6. The computer-implemented method of claim 4, wherein the attributes associated with the user selection comprise attributes associated with at least a vehicle year.

7. The computer-implemented method of claim 1, wherein the user selection is associated with a specific unique item.

8. The computer-implemented method of claim 1, wherein the primary attribute indicates a vehicle mileage.

9. The computer-implemented method of claim 1, wherein generating the predicted selling price model comprises using regression techniques.

10. The computer-implemented method of claim 1, wherein the predicted selling price indicator separates the two-axis plot into at least two regions each comprising some of the plurality of markers, the at least two regions comprising a first region above the predicted selling price indicator and a second region below the predicted selling price indicator.

11. A computer readable, non-transitory storage medium having a computer program stored thereon for causing a suitably programmed computer system to process by one or more processors computer-program code by performing a method for generating and updating an interactive market relative position visualization interface when the computer program is executed on the suitably programmed computer system, the method comprising:

maintaining, by a computer system, one or more electronic data stores that store information relating to a plurality of unique items currently and previously offered for sale;

generating, by the computer system, a predicted selling price model by analyzing a plurality of attributes of at least a portion of the plurality of unique items for which information is stored in the one or more electronic data stores;

transmitting, from the computer system to a user device, data that causes rendering of an interactive visualization interface, the interactive visualization interface comprising at least a selectable listing;

receiving, by the computer system, an indication of a user selection made via the interactive visualization interface;

determining, by the computer system, a set of comparison items, wherein the set of comparison items comprises a subset of the plurality of unique items for which information is stored in the one or more electronic data stores, the set of comparison items comprising unique items having one or more attributes that are the same or similar to attributes associated with the user selection;

determining, by the computer system, sets of marker coordinates for comparison items in the set of comparison items, wherein each set of marker coordinates comprises a primary attribute value for the respective comparison item and a listing price for the respective comparison item;

generating, using the predicted selling price model, data for displaying a predicted selling price indicator that illustrates a price range as a function of the primary attribute;

transmitting, from the computer system to the user device, data that causes re-rendering of the interactive visualization interface such that the interactive visualization interface comprises:
a two-axis plot comprising:
a plurality of markers corresponding to the sets of marker coordinates for comparison items; and
the predicted selling price indicator that illustrates a price range as a function of the primary value; and
a selectable listing that enables additional user selections that can cause additional re-rendering of the interactive visualization interface.

12. The computer readable, non-transitory storage medium of claim 11, wherein the plurality of markers are interactive markers configured to trigger a visible popup dialogue responsive to being interacted with via the user device, the visible popup dialogue comprising information based on the stored information.

13. The computer readable, non-transitory storage medium of claim 11, the method further comprising:
receiving, by the computer system, an indication of a Previously presented user selection made via the interactive visualization interface; and
transmitting, from the computer system to the user device, data that causes re-rendering of the interactive visualization interface such that at least the plurality of markers are based on a Previously presented set of comparison items associate with the Previously presented user selection.

14. The computer readable, non-transitory storage medium of claim 11, wherein the attributes associated with the user selection comprise attributes associated with vehicles.

15. The computer readable, non-transitory storage medium of claim 11, wherein generating the predicted selling price model comprises using regression techniques.

16. The computer readable, non-transitory storage medium of claim 11, wherein the predicted selling price indicator separates the two-axis plot into at least two regions each comprising some of the plurality of markers, the at least two regions comprising a first region above the predicted selling price indicator and a second region below the predicted selling price indicator.

17. A computer system for generating and updating an interactive market relative position visualization interface, the computer system comprising:
one or more computer readable storage devices configured to store a plurality of computer executable instructions; and
one or more hardware computer processors in communication with the one or more computer readable storage devices and configured to execute the plurality of computer executable instructions in order to cause the computer system to:
maintain, by the computer system, one or more electronic data stores that store information relating to a plurality of unique items currently and previously offered for sale;
generate, by the computer system, a predicted selling price model by analyzing a plurality of attributes of at least a portion of the plurality of unique items for which information is stored in the one or more electronic data stores;
transmit, from the computer system to a user device, data that causes rendering of an interactive visualization interface, the interactive visualization interface comprising at least a selectable listing;
receive, by the computer system, an indication of a user selection made via the interactive visualization interface;
determine, by the computer system, a set of comparison items, wherein the set of comparison items comprises a subset of the plurality of unique items for which information is stored in the one or more electronic data stores, the set of comparison items comprising unique items having one or more attributes that are the same or similar to attributes associated with the user selection;
determine, by the computer system, sets of marker coordinates for comparison items in the set of comparison items, wherein each set of marker coordinates comprises a primary attribute value for the respective comparison item and a listing price for the respective comparison item;
generate, using the predicted selling price model, data for displaying a predicted selling price indicator that illustrates a price range as a function of the primary attribute;
transmit, from the computer system to the user device, data that causes re-rendering of the interactive visualization interface such that the interactive visualization interface comprises:
a two-axis plot comprising:
a plurality of markers corresponding to the sets of marker coordinates for comparison items; and
the predicted selling price indicator that illustrates a price range as a function of the primary value; and
a selectable listing that enables additional user selections that can cause additional re-rendering of the interactive visualization interface.

18. The computer system of claim 17, wherein the plurality of markers are interactive markers configured to trigger a visible popup dialogue responsive to being interacted with via the user device, the visible popup dialogue comprising information based on the stored information.

19. The computer system of claim 17, wherein the one or more hardware computer processors are further configured to execute the plurality of computer executable instructions in order to cause the computer system to:
receive, by the computer system, an indication of a Previously presented user selection made via the interactive visualization interface; and
transmit, from the computer system to the user device, data that causes re-rendering of the interactive visualization interface such that at least the plurality of markers are based on a Previously presented set of comparison items associate with the Previously presented user selection.

20. The computer system of claim 17, wherein the attributes associated with the user selection comprise attributes associated with vehicles.

* * * * *